(12) United States Patent
Mishra et al.

(10) Patent No.: US 11,875,479 B2
(45) Date of Patent: Jan. 16, 2024

(54) FUSION OF DEEP LEARNING AND HANDCRAFTED TECHNIQUES IN DERMOSCOPY IMAGE ANALYSIS

(71) Applicants: Nabin K Mishra, Overland Park, KS (US); Reda Kasmi, Bejaia (DZ); William V. Stoecker, Rolla, MO (US); Jason R. Hagerty, Waynesville, MO (US); Pavani Jella, Campbell, CA (US); Norsang Lama, Rolla, MO (US)

(72) Inventors: Nabin K Mishra, Overland Park, KS (US); Reda Kasmi, Bejaia (DZ); William V. Stoecker, Rolla, MO (US); Jason R. Hagerty, Waynesville, MO (US); Pavani Jella, Campbell, CA (US); Norsang Lama, Rolla, MO (US)

(*) Notice: Subject to any disclaimer, the term of this patent is extended or adjusted under 35 U.S.C. 154(b) by 0 days.

(21) Appl. No.: 17/138,450

(22) Filed: Dec. 30, 2020

(65) Prior Publication Data
US 2021/0209754 A1    Jul. 8, 2021

Related U.S. Application Data

(60) Provisional application No. 62/956,510, filed on Jan. 2, 2020.

(51) Int. Cl.
*G06T 7/00* (2017.01)
*G06T 5/00* (2006.01)
(Continued)

(52) U.S. Cl.
CPC ............. *G06T 5/002* (2013.01); *G06T 5/005* (2013.01); *G06T 7/0012* (2013.01); *G06T 7/11* (2017.01);
(Continued)

(58) Field of Classification Search
CPC . G06T 7/0012; G06T 7/11; G06T 7/90; G06T 7/12; G06T 7/143; G06T 7/187;
(Continued)

(56) References Cited

U.S. PATENT DOCUMENTS

2006/0269111 A1* 11/2006 Stoecker ................ G16H 30/40
382/128

OTHER PUBLICATIONS

Hagerty et al., Deep Learning and Handcrafted Method Fusion: Higher Diagnostic Accuracy for Melanoma Dermoscopy Images, 2019, IEEE, 23(4): 1-7. (Year: 2019).*
(Continued)

*Primary Examiner* — John Villecco
*Assistant Examiner* — Kathleen M Broughton

(57) ABSTRACT

A system for identifying melanoma and other skin cancer in a dermoscopy image comprises: an image analyzer having at least one processor that instantiates at least one component stored in a memory, the at least one component comprising: a segmenter configured to segment a lesion from the rest of the image, a handcrafted feature component including: a median color splitting model for separating the image into a plurality of color regions, a vessel detection model for detecting elevated vascularity, an atypical pigment network detection model for identifying a pigment network whose structure varies in size and shape, a salient point detection model for detecting salient points based on an intensity plane of the image, a color detection model for detecting at least one of a white area, a pink shade, a pink blush, and a semi-translucency, a hair detection model for characterizing detected hairs and ruler marks, an outside model that finds the above model features on non-dark-corner areas outside the segmented area, and a classifier configured to provide a first analysis result.

36 Claims, 14 Drawing Sheets

(51) Int. Cl.
G06T 7/90 (2017.01)
G06T 7/11 (2017.01)
G06V 10/56 (2022.01)
G06V 10/46 (2022.01)
G06V 10/764 (2022.01)
G06V 10/82 (2022.01)

(52) U.S. Cl.
CPC .............. *G06T 7/90* (2017.01); *G06V 10/462* (2022.01); *G06V 10/56* (2022.01); *G06V 10/764* (2022.01); *G06V 10/82* (2022.01); *G06T 2207/30088* (2013.01); *G06V 2201/03* (2022.01)

(58) Field of Classification Search
CPC .. G06T 7/73; G06T 7/77; G06T 5/002; G06T 5/005; G06T 5/30; G06T 2207/30088; G06T 2207/20084; G06T 2207/10024; G06T 2207/20076; G06T 2207/20081; G06T 2207/20116; G06T 2207/20152; G06T 2207/20221; G06T 2207/30096; G06T 2207/30101; G06T 2201/03; G06V 10/255; G06V 10/30; G06V 10/462; G06V 10/56; G06V 10/82; G06K 9/6271
See application file for complete search history.

(56) References Cited

OTHER PUBLICATIONS

Dalal et al., Concentric Decile Segmentation of White and Hypopigmented Areas in Dermoscopy Images of Skin Lesions Allows Discrimination of Malignant Melanoma, 2010, Comput Med Imaging Graph, 35(2): 148-154. (Year: 2010).*

Kaur et al., Real-time Supervised Detection of Pink Areas in Dermoscopic Images of Melanoma: Importance of Color Shades, Texture and Location, 2015, Skin Res Technol, 21(4) 466-473. (Year: 2015).*

Mishra et al., An Overview of Melanoma Detection in Dermoscopy Images Using Image Processing and Machine Learning, 2016, Computer Vision and Pattern Recognition, arXiv: 1601.07843. (Year: 2016).*

Kasmi et al., Biologically inspired skin lesion segmentation using a geodesic active contour technique, 2015, Skin Res & Tech, 22(2) : 208-222. (Year: 2015).*

Majtner et al., Combining deep learning and hand-crafted features for skin lesion classification, 2016, IEEE, 2154-512X, 1-6. (Year: 2016).*

Li et al., From Deep Learning Towards Finding Skin Lesion Biomarkers, 2019, IEEE Engineering in Medicine and Biology Society, pp. 2797-2800. (Year: 2019).*

Vocaturo et al., Features for Melanoma Lesions Characterization in Computer Vision Systems, 2018, IEEE International Conference on Information, Intelligence, Systems and Applications, pp. 1-8. (Year: 2018).*

Li et al., Skin Lesion Classification via Combining Deep Learning Features and Clinical Criteria Representations, bioRxiv, pp. 1-7. (Year: 2019).*

Seeja et al., Deep Learning Based Skin Lesion Segmentation and Classification of Melanoma Using Support Vector Machine (SVM), 2019, Asian Pac J Cancer Prev 20(5): 1555-1561. (Year: 2019).*

* cited by examiner

FUSION OF DEEP LEARNING AND HANDCRAFTED TECHNIQUES IN DERMOSCOPY IMAGE ANALYSIS

CROSS-REFERENCE TO RELATED APPLICATIONS

This application claims priority to U.S. Provisional Patent Application No. 62/956,510, filed on Jan. 2, 2020, the contents of which are hereby incorporated by reference in their entirety.

BACKGROUND

An estimated 5 million cases of skin cancer and 91,270 cases of invasive melanoma were diagnosed in 2018 in the USA. About 9,320 people are estimated to have died of melanoma and over two thousand have died of other skin cancers in 2018. With dermoscopy imaging, melanoma and other skin cancers are fully visible at the earliest stage, when they are fully curable. Yet many cases of melanoma and other skin cancers are missed by domain experts.

Dermoscopy is an important tool in the early detection of melanoma and other skin cancer, increasing the diagnostic accuracy over clinical visual inspection in the hands of experienced physicians. Yet some embodiments of dermatologists using dermoscopy as a clinical tool (e.g., using their training and experience combined with dermoscopy) have shown lower diagnostic accuracy than computer techniques such as deep learning, machine vision techniques, and the combination of these, here termed fusion.

SUMMARY

Described herein are systems and methods that facilitate segmenting a dermoscopy image of a lesion to facilitate classification of the lesion. Generally, a dermoscopy image is received from an image source; pre-processed; and segmented. In some embodiments, segmenting the pre-processed dermoscopy image includes applying a thresholding algorithm to the dermoscopy image.

In various embodiments, a system for identifying melanoma and other skin cancer in a dermoscopy image comprises: an image analyzer having at least one processor that instantiates at least one component stored in a memory, the at least one component comprising: a segmenter, a handcrafted feature component, a deep learning feature component, and an overall classifier. The segmenter is configured to segment a lesion from the rest of the image. The handcrafted feature component includes a median color splitting model for separating the lesion into a plurality of color regions, a vessel detection model for detecting elevated vascularity, an atypical pigment network detection model for identifying a pigment network whose structure varies in size and shape, a salient point detection model for detecting salient points based on an intensity plane of the image, a color detection model for detecting at least one of a white area, a pink shade, a pink blush, and a semi-translucency, optionally a hair detection module, an outside-lesion feature module to detect all above features on the area of the image outside the lesion and not within dark corners, and a handcrafted classifier configured to provide a first analysis result. The deep learning feature component includes a deep learning feature detector for automatically detecting melanoma and other skin cancer features and an automatic classifier configured to provide a second analysis result. The overall classifier is configured to provide an overall analysis result based on the first analysis result and the second analysis result.

In some examples, the memory further includes a pre-processor configured for identifying and removing a noise from the image, the noise is selected from a group consisting of hair, ruler marking, bubble, and ink marking.

In some examples, the pre-processor is configured to scan a grayscale or red-plane version of the image horizontally and vertically within the same row and column for hair patterns.

In some examples, the pre-processor is configured to position a hair mask to indicate where on the image hairs are to be removed.

In some examples, the vessel detection model is configured for detecting vessels that are narrow and red.

In some examples, the vessel detection model is further configured for filtering bubbles on the image.

In some examples, the atypical pigment network detection model is configured for detecting areas having relatively high variance in the red and relative-red color planes.

In some examples, the atypical pigment network detection model is configured for determining asymmetry based on eccentricity of detected blocks.

In some examples, the atypical pigment network detection model is configured for applying a green-to-blue ratio threshold to remove false positive granular structures detected as atypical pigment network.

In some examples, detecting salient points based on an intensity plane of the image includes smoothing an intensity version of the image with a Gaussian filter to remove noise.

In some examples, the Gaussian filter has an optimal sigma value of 1.02.

In some examples, the pink shade includes at least one of a dark pink, light pink, and a pink-orange.

In some examples, the deep learning feature detector is a repurposed pre-trained ResNet model repurposed via transfer learning.

In some examples, the color detection model is configured for identifying at least one of the white area features including an average eccentricity feature, a relative size of all white areas compared to lesion area, a relative size of largest white area compared to lesion area, an absolute size of the largest white area, a number of marked white areas per unit lesion area, an average border irregularities of all white areas, and a white area dispersement index.

In some examples, the color detection model is configured for automatically marking white area on the image based on an average RGB value.

In some examples, the color detection model is configured for converting the automatically marked image into a binary mask for separation of the white area via multiplication with the image.

In some examples, the color detection model is configured for automatically marking one or more pixels as white when a pixel has one or more color components exceeding one or more threshold values corresponding to one or more color planes, the one or more color planes including at least a red plane, a green plane, or a blue plane. In other examples, other color systems may be used instead of the red plane, green plane, and blue plane. These include the intensity, hue and value color system, and the International Commission on Illumination (CIELAB) color space, also known as the La*b* color space.

In some examples, the atypical pigment network detection model is configured for automatically segmenting atypical pigment network based on a variance in a red plane in a lesion area of the image.

In some examples, the atypical pigment network detection model is configured for extracting at least one morphological feature selected from the group consisting of lesion area, APN area, ratio of APN area to lesion area, ratio of number of APN blocks to lesion area, ratio of number of APN blocks to number of APN blobs, centroid distance between APN mask centroid and lesion border mask centroid, lesion normalized centroid distance, total number of the outermost pixels of the lesion, ratio of lesion area to image area, APN normalized centroid distance, ratio of lesion perimeter to square root of lesion area, and ratio of lesion perimeter to square root of APN area.

In some examples, the atypical pigment network detection model is configured for extracting at least one textural feature selected from the group consisting of average brightness, average contrast, relative smoothness, skewness, uniformity, and entropy.

In some examples, the atypical pigment network detection model is configured for extracting at least one color feature selected from the group consisting of average intensity of red color in APN region, average intensity of green color in APN region, average intensity of blue color in APN region, standard deviation of intensity of red color in APN region, standard deviation of intensity of green color in APN region, and/or standard deviation of intensity of blue color in APN region.

In some examples, the salient point detection model is configured for extracting candidate line points from the image and linking a plurality of salient points from the candidate line points.

In various embodiments, a method for diagnosing melanoma and other skin cancer from a dermoscopy image using a diagnostic system including a handcrafted classifier and a deep learning classifier includes: performing median color split to the image to separate the image into a plurality of color regions; performing vessel detection to analyze one or more vessel features; performing atypical network detection to identify a pigment network whose structure varies in size and shape; performing salient point detection to detect salient points based on an intensity plane of the image; performing color detection to detect at least one of a white area, pink shade, a pink blush, and a semi-translucency; optionally a hair detection module to analyze one or more hair features; providing a first analysis result using the manual classifier; performing deep learning feature detection to automatically detect melanoma and other skin cancer features; providing a second analysis result using the deep learning classifier based on the automatically detected melanoma and other skin cancer features; and providing an overall analysis result based on the first analysis result and the second analysis result.

In some examples, the method further includes pre-processing the image to identify and remove hair noise from the image.

In some examples, performing vessel detection includes detecting vessels that are narrow and red.

In some examples, performing vessel detection includes filtering bubbles on the image.

In some examples, performing atypical network detection includes determining asymmetry based on eccentricity of detected blocks.

In some examples, performing salient point detection includes detecting salient points based on an intensity plane of the image.

In some examples, performing hair detection to count and characterize hairs as more or less dense, more or less dark, and long versus short.

In some examples, performing deep learning feature detection to automatically detect melanoma and other skin cancer features includes repurposing a pre-trained ResNet model via transfer learning. In others examples, deep learning models such as EfficientNet or DenseNet are used.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 10 shows additional hair filtering steps. These steps enable detection of short hairs.

FIG. 11 shows dark corner detection.

Figure 1:
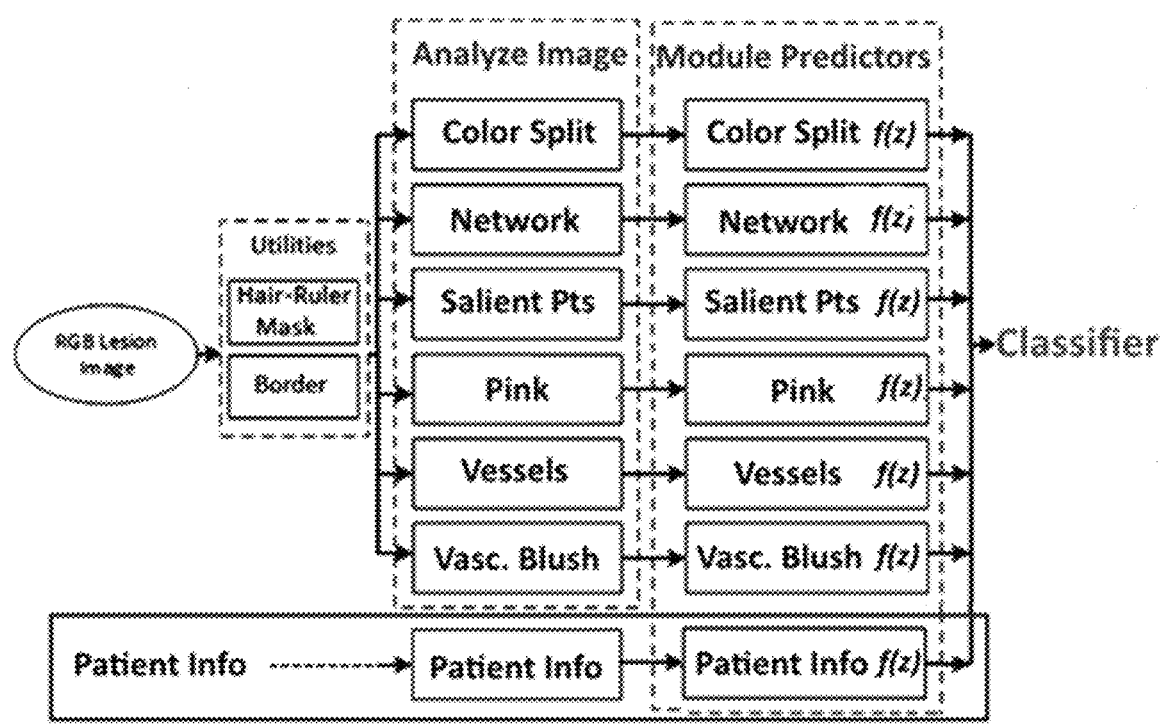
FIG. 1 is an illustrative diagram depicting handcrafted feature data flow, in accordance with embodiments of the disclosure.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims. For example, one color plane system (red, green and blue) is given in the methods. Other color systems may be used instead of the red plane, green plane, and blue plane. These include the intensity, hue and value color system and the International Commission on Illumination (CIELAB) color space, also known as the La*b* color space.

Although the term "block" may be used herein to connote different elements illustratively employed, the term should not be interpreted as implying any requirement of, or particular order among or between, various blocks disclosed herein. Similarly, although illustrative methods may be represented by one or more drawings (e.g., flow diagrams, communication flows, etc.), the drawings should not be interpreted as implying any requirement of, or particular order among or between, various steps disclosed herein. However, certain embodiments may require certain steps and/or certain orders between certain steps, as may be explicitly described herein, or as indicated in the drawings, and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As the terms are used herein with respect to ranges of measurements (such as those disclosed immediately above), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

DETAILED DESCRIPTION

Segmentation of skin lesions is used in computer-aided diagnosis (CAD) of skin cancer. Segmentation determines a border or contour that separates the lesion from the surrounding skin, and the extraction and classification of clinical dermoscopy features, such as atypical pigment network and color, depends on the accuracy of segmentation. The contour is most commonly one picture element (pixel) wide, and is closed, completely enclosing a single undivided part of the image. The conventional goal of segmentation is to include, approximately, the skin lesion, specifically as much of the skin lesion as possible to the exclusion of surrounding skin. Success of segmentation of an image is traditionally measured by the two types of error involved: 1) the amount of the surrounding skin included within the border, measured in pixels within the image; and 2) the amount of the lesion not included within the border, measured in pixels within the image. Success of segmentation in an image can be measured as a function of the two errors. Such a function is optimized for diagnosis when the second type of error is somewhat lower than the first error. Equivalently, the best weighting for a cost function to measure the border error gives a greater weight to errors of the second kind than errors of the first kind. In one embodiment, a border is optimized when an error of the second kind is twice the error of the first kind.

As used herein, the term "dermoscopy" refers to a body imaging technique that involves viewing skin lesions with 8× or more magnification. The technique involves limiting surface reflectance through the use of, for example, a fluid, gel, mineral oil, or alcohol between the skin and a glass plate, or by using cross polarized light for illumination. The term "dermoscopy image" refers to a photograph of a skin lesion using a dermoscopy technique. In certain embodiments, the dermoscopy image is a digital image. Dermoscopy images may be acquired using any method known in the art, including but not limited to using a specialized dermoscopy imaging platform and inexpensive digital cameras, including cameras incorporated in a smartphone, with a dermoscopy-specific attachment or lens.

In various embodiments, a classifying system and/or a method of classifying provide a "best match" among a plurality of candidate segmentation algorithms for a given type of lesion and image, wherein the segmentation results may be improved over results obtained from a single segmentation technique or a weighted fusion of borders that can propagate errors. In certain embodiments, the classifying system and/or the method of classifying automatically select the best among the segmentations obtained from multiple algorithms. In some embodiments, the classifying system and/or the method of classifying solves the border selection problem. In various embodiments, the classifying system includes an automatic dermoscopy skin lesion border classifier, such as one configured to select the best lesion border among available choices for a skin lesion.

In accordance with various embodiments, the disclosed methods include a method of processing an image using a combined (e.g., fused) technique which combines conventional (e.g., handcrafted) image processing techniques and deep learning techniques, which may combine one or more features of one or more individual techniques. In some embodiments, the combined technique combines a first technique having a first error profile with a second technique having a second error profile different from the first error profile. In certain embodiments, the conventional image processing arm (e.g., technique) uses one or more (e.g., three) handcrafted biologically-inspired image processing modules and a clinical information module. In some embodiments, the one or more image processing modules are configured to detect lesion features, such as clinical dermoscopy information (e.g., atypical pigment network, color distribution, and/or blood vessels). In some embodiments, the clinical information module includes patient information (e.g., patient age, gender, lesion location, size, and/or patient history) that may have been submitted to a pathologist. In various embodiments, the deep learning arm (e.g., technique) is configured to utilize knowledge transfer (e.g., via a ResNet-50 network, or a repurposed ResNet-50 network) to predict the probability of melanoma and other skin cancer classification. In some embodiments, the method includes combining (e.g., by utilizing logistic regression) classification scores of each individual module from both processing arms (e.g., techniques) to predict an overall melanoma and other skin cancer probability. In some embodiments, the method using the fusion (combined) technique is configured to obtain classification accuracy above 0.90, such as 0.94, according to cross-validated results of melanoma and other skin cancer classification measured by area under a receiver operator characteristic curve (AUC). For comparison, a ResNet-50 deep learning-based classifier alone yields an AUC of 0.87 and a conventional image processing-based classifier yields an AUC of 0.90. EfficientNet and DenseNet are used for deep learning in other examples In some embodiments, described herein is a system and/or a method for diagnosing melanoma and other skin cancers. In some embodiments, the described systems and/or methods analyze dermoscopy images, such as via a classifier (e.g., utilizing deep learning and/or transfer learning). In various embodiments, the systems and methods disclosed pertain to handcrafted and deep learning techniques for computer-aided diagnosis of skin lesions. In certain embodiments, the methods disclosed pertain to skin cancer diagnosis using fusion of handcrafted (e.g., handcrafted dermoscopy structure features, which are medically supervised) and deep learning techniques, resulting in higher diagnostic accuracy than either technique alone. In some embodiments, the fusion (combined) technique combines the handcrafted techniques having a first diagnostic error profile and the deep learning techniques having a second diagnostic error profile different from the first error profile.

In some embodiments, the conventional image processing techniques include image processing modules for finding medically meaningful features (e.g., lesion color distribution patterns, narrow vessels, and atypical pigment network (APN)) such as finding via handcrafted features (e.g., techniques). In certain embodiments, a clinical information module includes information submitted to a pathologist, such as patient age, gender, lesion location, size, and/or melanoma or cancer-specific historical items. In some embodiments, a deep learning (DL) network of a DL technique includes a repurposed pre-trained DL architecture that is refocused for melanoma and other skin cancer classification.

Handcrafted Feature Detection

In some embodiments, the method uses conventional handcrafted image analysis techniques that detect medically important melanoma and other skin cancer features. In some embodiments, patient information is conveyed directly to a classifier (e.g., one used for the diagnosing method). In some embodiments, the method includes applying lesion image pre-processing utilities that check color and focus and remove hair from the dermoscopy images. In certain embodiments, lesion image pre-processing may include applying handcrafted (e.g., medically supervised) image-processing modules for features of importance in melanoma and other skin cancer diagnosis. In certain embodiments, logistic regression (e.g., Proc Logit, SAS Inc., Cary, N.C.) removes non-significant features (e.g., $p>0.05$). FIG. 1 is an illustrative diagram depicting handcrafted feature data flow, in accordance with embodiments of the disclosure.

A. Pre-Processing

In some embodiments, an image is checked for focus and color (e.g., standard color) ratios. In certain embodiments, a $2^{nd}$ order spline filter and/or a lesion mask are applied. The lesion mask may have a border identified and outlined by a dermatologist. In some embodiments, the method includes identifying and removing noise from an image. For example, the noise includes hair noise, ruler marking noise, bubble noise, and/or ink marking noise, any of which may mimic APN lines in pigmented lesions. The foregoing list of noise sources is exemplary and not restrictive. In certain examples, detecting noise helps reduce distortion in a malignancy assessment process. In some examples, additional information can be extracted from the detected noise (e.g., as sources of information).

Figure 2A:
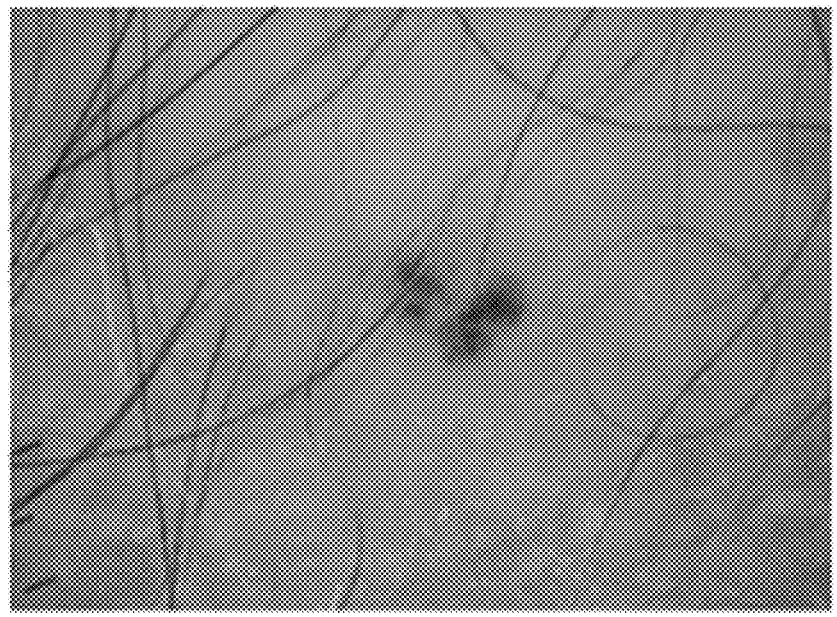
FIG. 2A is a sample image showing hair artifacts, in accordance with embodiments of the disclosure.
Figure 2B:
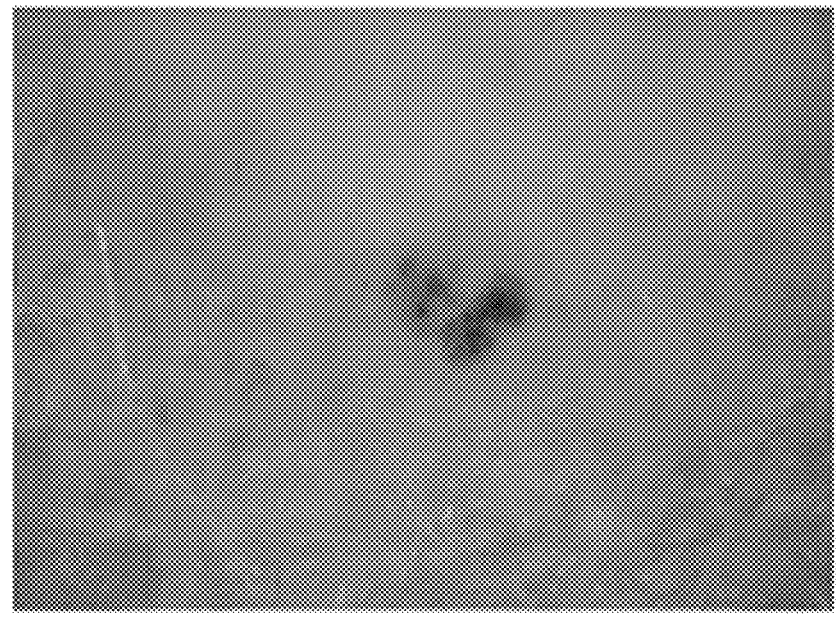
FIG. 2B is a version of the sample image depicted in FIG. 2A, in which the hair artifacts have been removed, in accordance with embodiments of the disclosure.

As an example, the color, length and width of the detected hairs yield age and gender information corresponding to the subject, and therefore comprise diagnostic information. Handcrafted features obtained from hair mask statistics include number of hairs, average and standard deviation of hair length, width, and length to width ratios, measurements of color features in different color scales including red, green, blue, and intensity planes. Ruler markings provide similar information as to the source of the lesions and the make of the dermoscopy instrument. In some embodiments, the method includes detecting hair on a modified red plane image (e.g., 1.64×R), such as by scanning horizontally and/or vertically within the same row and/or column for hair patterns. In some embodiments, a modified grayscale image with red emphasis is scanned by a horizontal array of pixels (e.g., 1×7 pixels) to detect the difference between the smallest and the largest pixel values. In some embodiments, hair or ruler marks are identified when the difference exceeds a threshold of 15. In some embodiments, removing hair noise includes placing three parallel, horizontally-oriented masks (e.g., 5×7 pixels) centered on the identified hair segment. In some embodiments, removing hair noise includes replacing the central mask with the average of two adjacent masks. In some embodiments, the removal of hair noise includes applying vertically-oriented masks and horizontal-oriented masks separately to the grayscale image with red emphasis, and then the maximum of both resulted images are computed. In some embodiments, the method includes generating a binary mask by subtracting a final image (e.g., with hair noise removed) from a grayscale image with red plane emphasis and applying a threshold. In some embodiments, the method includes morphologically filtering the binary mask to remove extraneous objects resulting in the final hair mask. In some embodiments, the method includes using the final hair mask to indicate the regions within a RGB image where the detected hairs are to be digitally removed. These areas are eliminated from consideration for APN detection. Another method uses a technique such as linear interpolation to avoid false atypical pigment network (APN) detection. FIG. 2A is a sample image showing hair artifacts, in accordance with embodiments of the disclosure. FIG. 2B is a version of the sample image depicted in FIG. 2A, in which the hair artifacts have been removed, in accordance with embodiments of the disclosure. In some embodiments, the described hair-removal algorithm has an average accuracy above 95%, such as 96.15% (e.g., for a sample set of 520 images). For comparison, a conventional hair-removal algorithm has an average accuracy below 95%, such as 93.8% for 'Dullrazor', when applied to process the same sample set. The removed hair mask is retained and is processed to determine features such as average hair length, color, and density. The mask and the information post processing is used to identify clinical features contained in the mask, for instance length, color and density of hairs provide information on location, gender and age of patient (e.g., white hairs correlate with age, short (shaved) widely spaced hairs correspond to female legs, and short (shaved) dense hairs correspond to male faces).

B. Median Color Split Algorithm

Figure 3A:
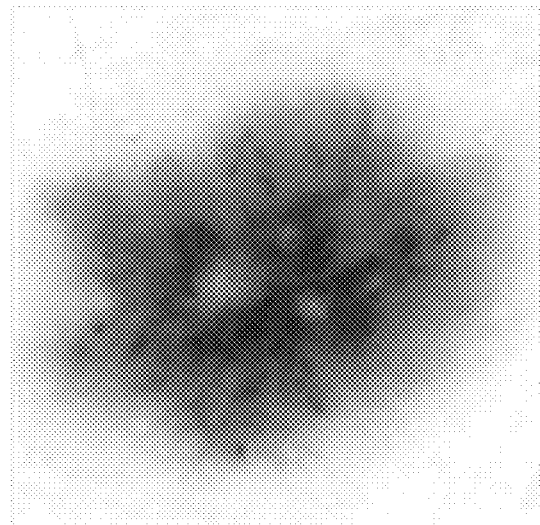
FIG. 3A is a sample image showing a representative lesion, in accordance with embodiments of the disclosure.
Figure 3B:
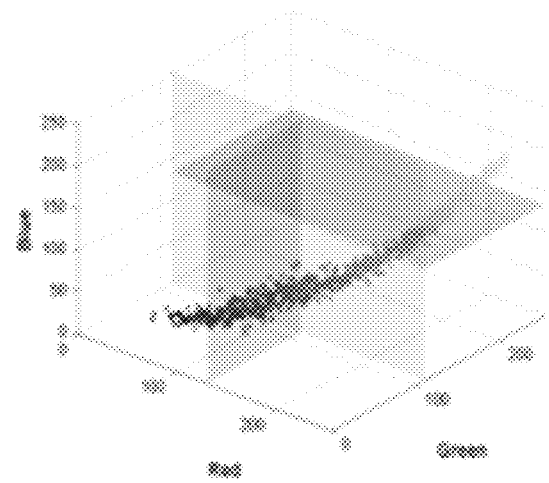
FIG. 3B is a color histogram graph obtained from processing the sample image of FIG. 3A, in accordance with embodiments of disclosure.
Figure 3C:
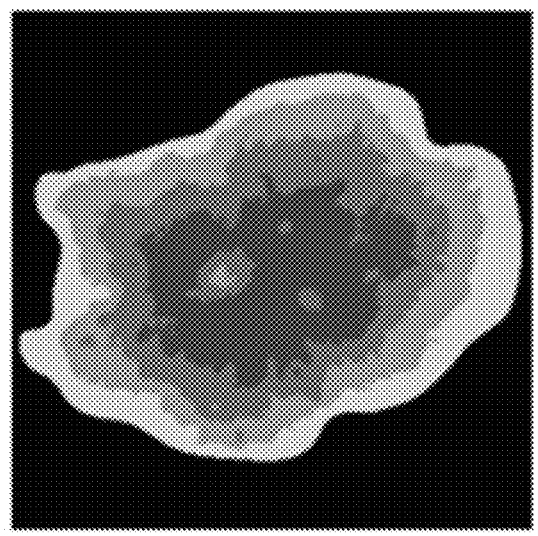
FIG. 3C is a median split version of the sample image of FIG. 3A, in accordance with embodiments of disclosure.

In various embodiments, the method includes using a median split pixel clustering algorithm, which may be based upon the characteristics of an image's color histogram. In some embodiments, the method includes applying the median split algorithm to pixels in the area of a lesion, such as after a lesion border is used to segment the lesion from the rest of a dermoscopy image. In various embodiments, applying the median split algorithm includes considering all lesion-area pixels to be in a single color bin, such as one that has R, G, B dimensions (or components) in the red, green and blue (RGB) planes. In some embodiments, applying the median split algorithm includes splitting the dimension (e.g., one of the R, G, and B dimensions) having the largest range at the median color, such that two resulting bins have equal numbers of pixels. In certain embodiments, the method includes multiple iterations, for example, each subsequent iteration first considers the ranges of the colors in the current bin, and then splits the bin having the largest range into two bins having equal pixel populations. In some embodiments, the bin with the highest range on any color axis is chosen for the subsequent split, such as subsequently split at the median color. In some embodiments, applying the median split algorithm includes performing three iterations of median splitting, which may result in a lesion segmented into four color regions. In certain embodiments, each color region is represented by an average color of each color region. FIG. 3A is a sample image of a benign nevus showing a lesion, in accordance with embodiments of the disclosure. FIG. 3B is a color histogram graph obtained from processing (e.g., via the median split algorithm) the sample image of FIG. 3A, in accordance with embodiments of disclosure. FIG. 3C is a median split version of the sample image of FIG. 3A, in accordance with embodiments of disclosure. In some embodiments, applying the lesion mask to an image (e.g., RGB image, such as the sample image of FIG. 3A) is performed before applying the median split algorithm, such as so that only lesion colors are split by the median split algorithm. As shown in FIGS. 3A-3C, the method is configured to capture varied and/or radial symmetry of colors (e.g., brown colors) on an image (e.g., FIG. 3A). In one embodiment, a median split feature vector, size 264, is obtained from a constant division of the lesion into four colors, which includes 63 color and texture features (e.g., calculated from the respective areas in the original lesion image) in each color region and 12 global features.

C. Telangiectasia Vessel Detection Algorithm

In some embodiments, the method includes applying a vessel detection method (e.g., the Cheng vessel detection method) to the lesion mask to detect predominant features in amelanotic melanoma, and other skin cancers including basal cell carcinoma, such as to detect vessel features of blood vessels.

In various embodiments, the method includes performing uniform contrast enhancement and brightness decrease to images that fail a minimum standard deviation contrast threshold. In some embodiments, the vessel detection algorithm applied is based upon the medical finding that vessels are narrow and relatively red. In certain embodiments, the method includes measuring distance from a candidate vessel pixel, such as via the Chebyshev (chessboard) distance. In various embodiments, the Chebyshev distance is one for (of) 8-connected pixels. In some embodiments, a minimum pixel intensity drop is demanded for each color at a given Chebyshev distance in at least 2 directions separated by at least 135°. Vessels may appear red due to the drop in color from the surrounding pixels being greater for blue and green colors, thus the optimal color minimum drops from surrounding skin may be optimized in the order blue>green>red. In some embodiments, detecting vessels includes detecting Chebyshev distances (d). In some embodiments, the measured Chebyshev distance is in the range 2≤d≤7. In some embodiments, detecting vessels includes removing vessel candidates which are brown network lines, such as by setting a color rule (e.g., G>B+5) for a given pixel.

In various embodiments, the method includes performing bubble filtering (e.g., as part of the pre-processing process), such as using a modified range filter (MRF) operating on the pixel p: $MRF(p)=(p-\mu_{local})*(\Delta_{max})$.

Figure 4A:
FIG. 4A is a sample image showing telangiectasia, in accordance with embodiments of disclosure.
Figure 4B:
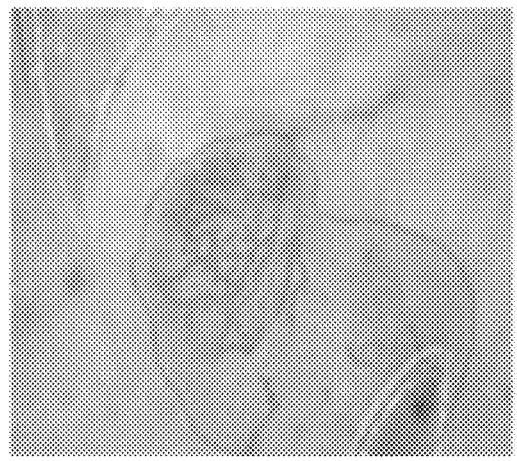
FIG. 4B is a version of the sample image of FIG. 4A, in which the bubble noise is identified, in accordance with embodiments of disclosure.
Figure 4C:
FIG. 4C is a version of the sample image of FIG. 4C, in which the bubble noise is removed, in accordance with embodiments of disclosure.

In one embodiment, the local average $\mu_{local}$ is the average value of a 49×49 window centered on the candidate pixel; local range $\Delta_{max}$ is the maximum pixel difference in the 3×3 neighborhood or pixel p. In some embodiments, a pixel is marked as a bubble pixel if ten or more pixels in the local average area satisfy a modified range filter minimum of 0.5. FIG. 4A is a sample image showing telangiectasia, in accordance with embodiments of disclosure. FIG. 4B is a version of the sample image of FIG. 4A, in which the bubble noise is falsely identified as having telangiectasia, in accordance with embodiments of disclosure. FIG. 4C is a version of the sample image of FIG. 4A, in which the bubble noise is identified and the false telangiectasia removed, in accordance with embodiments of disclosure. As shown in FIGS. 4A-4C, the color drop candidate pixels before and after pruning of bubble pixels, according to some embodiments. In some embodiments, the method includes deriving a plurality of features (e.g., 11) from the detected objects, such as from object lengths, widths, eccentricity, total objects, and/or object statistics, such as to capture the medical meaning of skin cancer vessels being more numerous, longer, narrower, and more regular in width than objects detected in benign lesions.

D. Atypical Pigment Network Detection

Figure 5A:
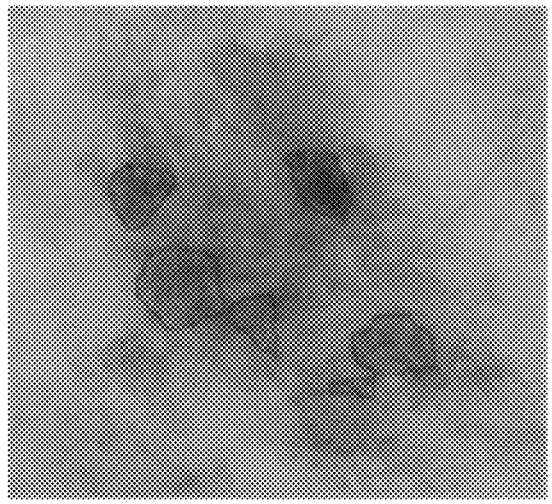
FIG. 5A is a sample image showing APN areas, in accordance with embodiments of disclosure.
Figure 5B:
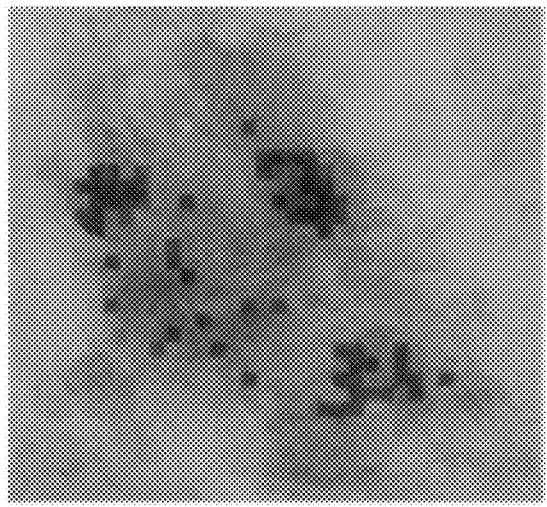
FIG. 5B is a version of the sample image of FIG. 5A, in which an APN overlay is applied, in accordance with embodiments of disclosure.
Figure 5C:
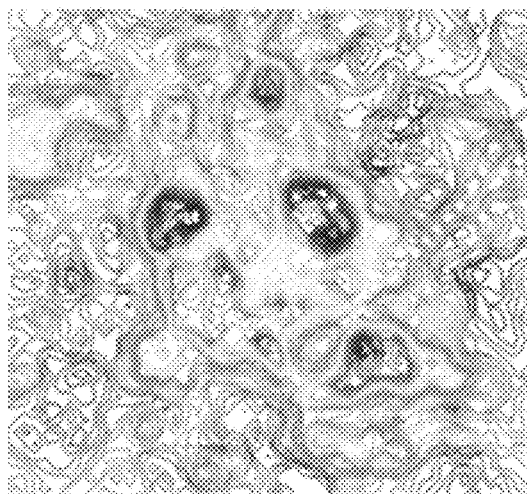
FIG. 5C is a version of the sample image of FIG. 5A, in which a plot of red variance is displayed, in accordance with embodiments of disclosure.

In various embodiments, the method includes diagnosing benign melanocytic nevi, which may show a visible pigment network that is fairly symmetric and regular, and/or diagnosing irregular or atypical pigment network (APN), which may have pigment network whose structure varies in size and/or shape. For example, irregular wide or dark APN aberrations may appear as a brown mesh, a black mesh, a gray mesh, and/or thick lines in dermoscopy images. In some embodiments, the method uses a variance detection method for APN, such as an APN of Mishra. In various embodiments, the variance detection method is configured for APN areas having relatively high variance in the red and relative-red color planes (e.g., found by subtracting the average red value of surrounding skin from the red color plane values in the lesion). In some embodiments, the relative-red plane is divided into 16×16 blocks. In various embodiments, the method includes selecting APN candidates by detecting blocks where variance falls above an adaptive threshold calculated using the mean and standard deviation of variance among all the 16×16 blocks of the lesion. In various embodiments, the method includes using a green-to-blue threshold for each pixel to remove the false positive granular structures that were detected as APN. In some embodiments, the method includes determining APN blocks to calculate total APN area and APN asymmetry, such as by determining eccentricity of detected blocks. In certain embodiments, a plurality (e.g., 52) of features for APN include color and texture features as for pink areas. FIG. 5A is a sample image showing APN areas, in accordance with embodiments of disclosure. FIG. 5B is a version of the sample image of FIG. 5A, in which an APN overlay is applied, in accordance with embodiments of disclosure. FIG. 5C is a version of the sample image of FIG. 5A, in which a plot of red variance is displayed, in accordance with embodiments of disclosure. As shown, FIG. 5 shows a lesion with dermatologist-annotated APN, the lesion's APN area, and a red variance plot of the image of the lesion, according to some embodiments. In some embodiments, the disclosed method is able to identify pigment networks that are reasonably symmetric and to correctly identify benign lesions by the APN technique.

E. Demographic Features

In various embodiments, the method includes receiving one or more demographic features, such as patient age (e.g., bracketed by decades to avoid personal identification), gender, lesion location, and/or lesion size. The demographic features may be provided by a pathologist, which may have been given to the pathologist when a biopsy is submitted. In some embodiments, the method includes receiving one or more categorical features, such as patient concern, change noted, family history of melanoma, patient history of melanoma, and/or clinic site. In certain embodiments, the method includes identifying lesion change and/or concerning lesion-related information of significance in melanoma and other skin cancer diagnosis.

F. Salient Point Detection

In various embodiments, the method includes detecting salient points, such as by using Steger's method of line detection. In some embodiments, detecting salient points includes identifying dark lines in an image as having a low first-order derivative in the direction of the line and a high second derivative in the orthogonal direction. In some embodiments, detecting salient point includes using an intensity plane to detect salient points, such as for discriminating melanoma and other skin cancers. In certain embodiments, using Steger's method includes implementing the Steger's method by smoothing an intensity image with a Gaussian filter to remove noise. In some embodiments, implementing the Steger's method including selecting an optimal filter sigma value (e.g., 1.02). In some examples, the intensity plane is found to be the optimal color plane for salient point detection among the planes compared: the intensity plane, the principal component transform plane, the blue plane, the luminance plane, and the X-plane of the CIE-XYZ color system. In one embodiment, the method determines six salient point statistics, raw and normalized by intensity for 16×16 pixel image blocks over all pixels in the lesion. These six salient point statistics are mean number of salient points per block, mean of standard deviation over all blocks, median number of salient points per block, and each of the preceding three statistics divided by average of intensity for the block. In some embodiments the lesion is divided into five areas, using the distance transform, to create five ring-like quintile areas with differing centrality, inner to outer, in the lesion. The preceding six statistics are saved over each quintile, yielding thirty salient point statistics.

G. Detection of Specific Colors

In certain embodiments, the method includes identifying pink color, such as for detecting amelanotic melanoma and/or other skin cancers. For example, the method may include identifying dark, light, and/or pink-orange. In some embodiments, the method includes identifying second-order texture features and/or quintile locations. In one embodiment, the method includes identifying semi-translucency (e.g., pink blush), such as by the Kefel method.

In various embodiments, the method includes identifying white and/or scar-like depigmented areas, such as ones that may represent the process of regression, such as ones that are indicators (e.g., important) of melanoma and other skin cancers, such as indicators of a response of the immune system to melanoma and other skin cancers. In some embodiments, the method includes detecting hypopigmented areas that are peripheral and/or symmetric, which may be characteristic of benign lesions, such as of a dysplastic nevus. In some embodiments, the method includes analyzing white color with respect to shade and with regard to position within the lesion. In various embodiments, the method is configured to use a multivariate model that includes median split colors in which white colors are not found to be significant. In some embodiments, white areas external to the lesion segmentation are of diagnostic importance. Statistics determined on white areas include size of the area, eccentricity of the area, dispersement index, ratios of the white areas in the different deciles, and combined statistics for white areas both internal and external to the lesion.

H. Detection of Hair Features

Hair can provide diagnostic information from recorded statistics on where the hair is found, color of the hair, the length and width of hair, the ratio of length to width, the standard deviation of these features, and the like. Hair within the lesion and not outside the lesion is an indication of a benign nevus. Thus a greater number of hairs inside the lesion than outside the lesion, particularly if hairs are long, indicates that the lesion is benign. Short hairs, as long as the hairs are wide enough, are an indication that the hairs have been shaved, and accordingly can give gender and body location information. Close-up lesions may lack a designation of body location, thus a sign that the hairs are terminal indicate that the area has been shaved. Shaved hairs in high number (more dense) indicate a male face, and in lower number (less dense) indicate a female leg. White hairs may indicate an older person and thus a greater chance of cancer.

The detection of long hairs is performed as described above.

Figure 10A:
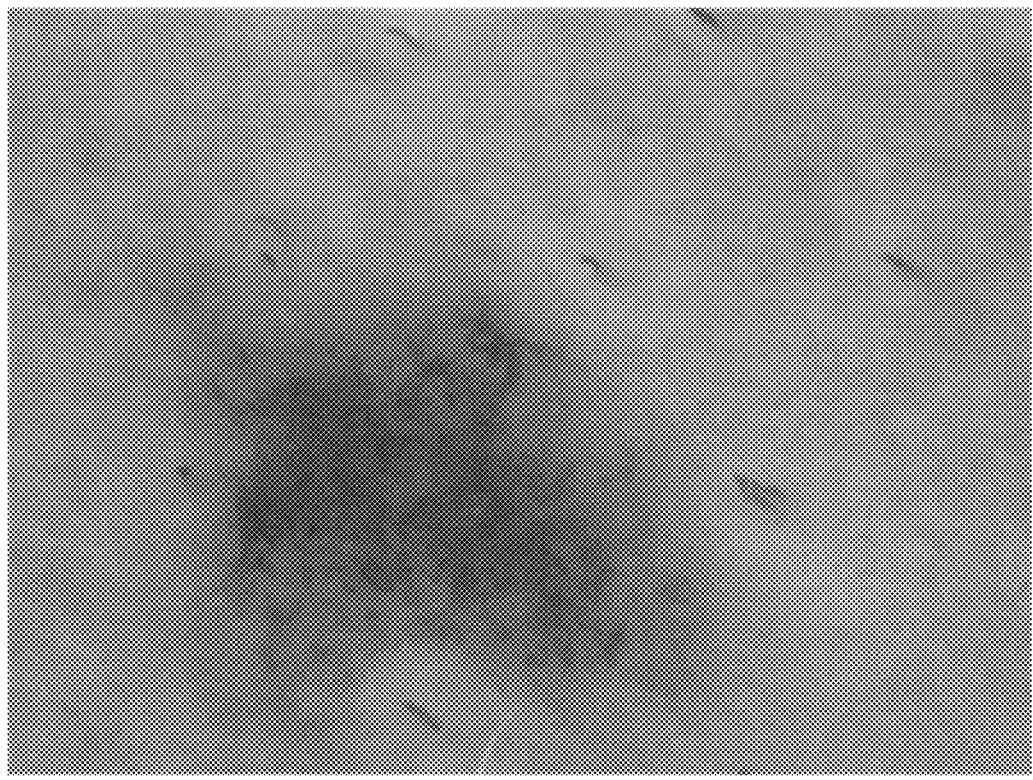
FIG. 10A shows an image with short hairs.
Figure 10B:
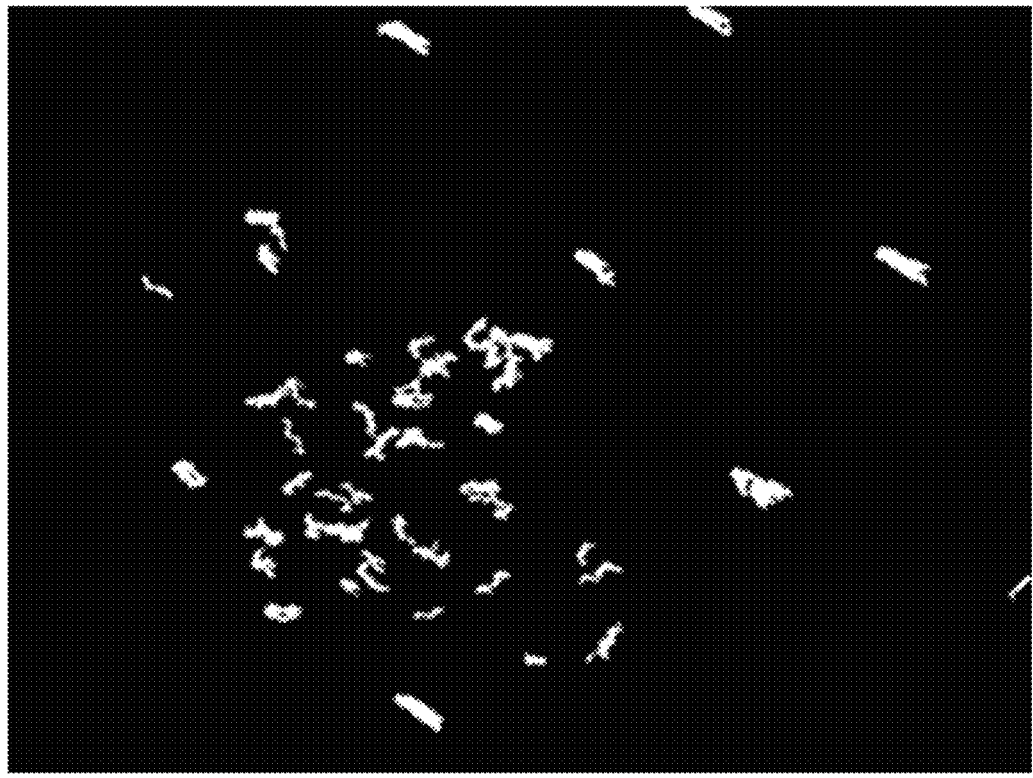
FIG. 10B shows the mask of short hairs detected which includes non-hair objects falsely detected.
Figure 10C:
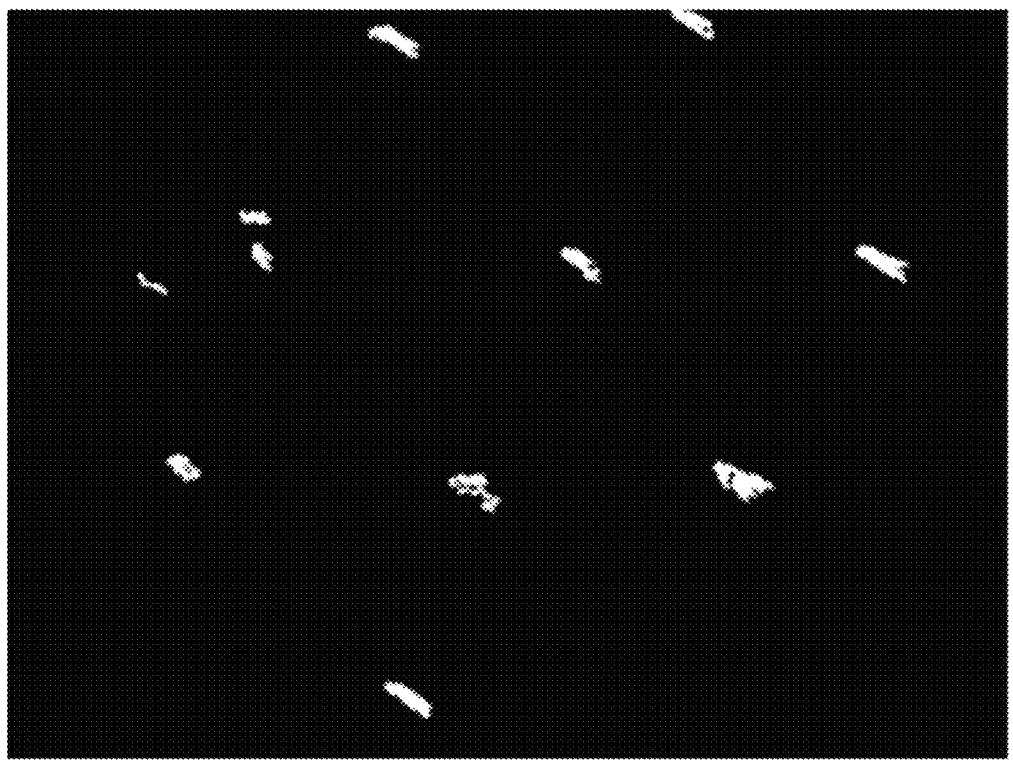
FIG. 10C shows the mask after a filter for luminance and shape is applied to remove non-hair objects.
Figure 10D:
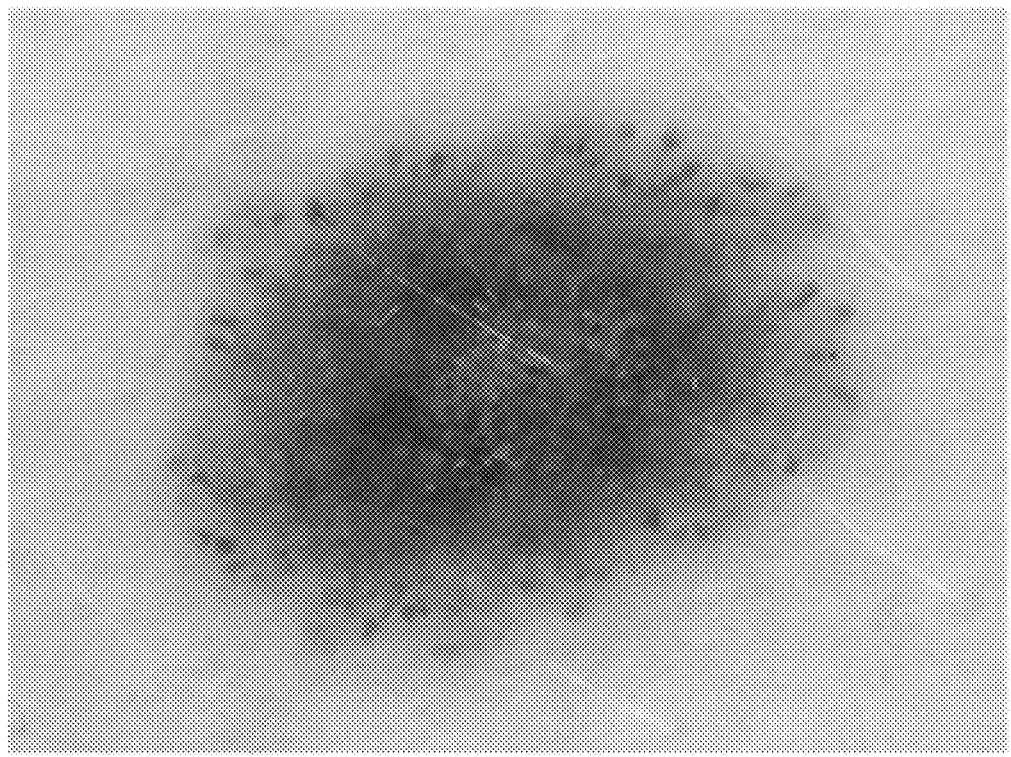
FIG. 10D shows another image with small objects resembling short hairs.
Figure 10E:
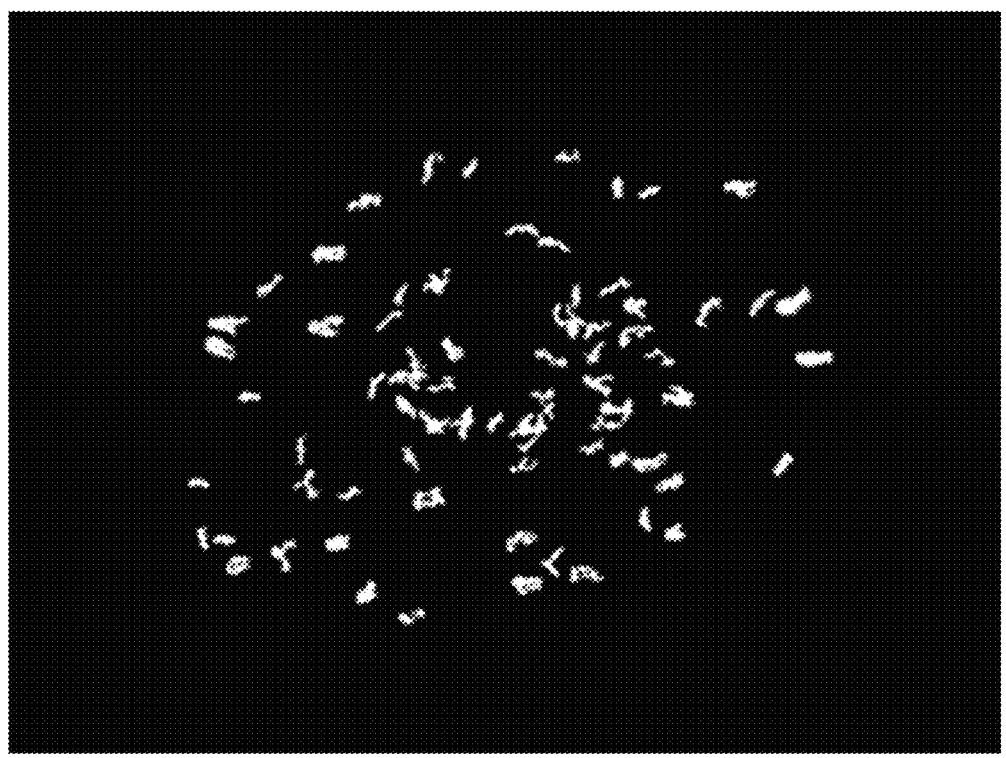
FIG. 10E shows the mask of short hairs detected which includes non-hair objects falsely detected.
Figure 10F:
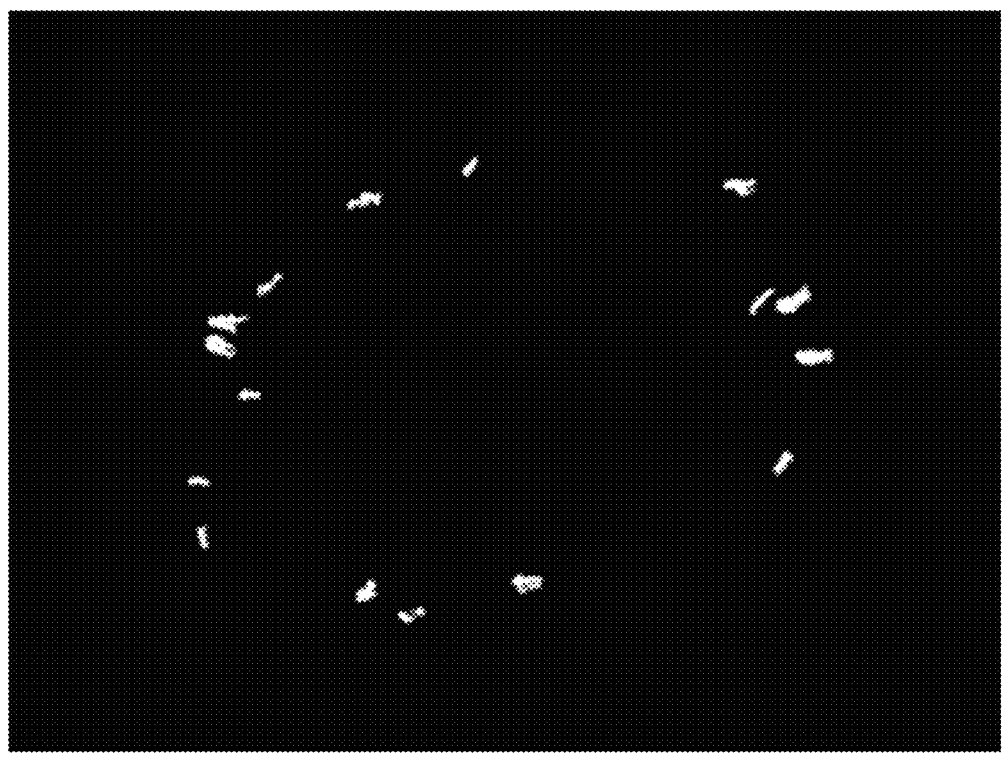
FIG. 10F shows the mask after a filter for luminance and shape is applied to remove most of the non-hair objects detected.
Figure 10G:
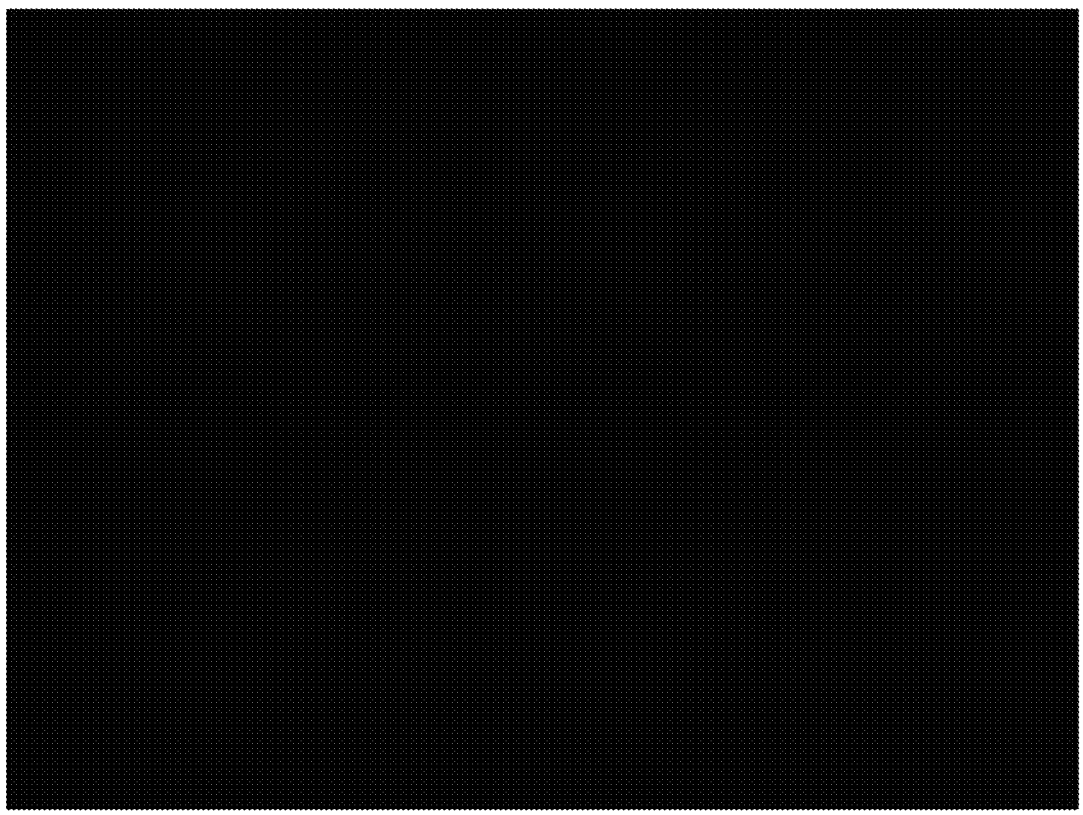
FIG. 10G shows the mask after post-processing applies a threshold to remove all objects inside the lesion if the ratio of the number of objects inside the lesion divided by the lesion area to the number of objects outside the lesion divided by the outside-lesion area exceeds a threshold. All non-hair objects are removed.

The hair algorithm above fails to detect many short hairs. The short hair refinement detects small objects and is further filtered by luminance and shape, and finally subject to post-processing to remove non-hairs interior to the lesion. FIG. 10 shows additional hair filtering steps. These steps enable detection of short hairs. FIG. 10A shows an image with short hairs. FIG. 10B shows the mask of short hairs detected which includes non-hair objects falsely detected. FIG. 10C shows the mask after a filter for luminance and shape is applied to remove non-hair objects. FIG. 10D shows another image with objects falsely detected as short hairs. FIG. 10E shows the mask of non-hair objects falsely detected. FIG. 10F shows the mask after a filter for luminance and shape is applied to remove non-hair objects detected. FIG. 10G shows the mask after post-processing applies a threshold to remove all objects inside the lesion if the ratio of the number of objects inside the lesion divided by the lesion area to the number of objects outside the lesion divided by the outside-lesion area exceeds a threshold.

I. Detection of Image Features in Areas Outside Lesion and not in Dark Corners.

All image-processing features are applied in a similar manner to the area outside the lesion and not within dark corners. The image processing features include B. Median Color Split Detection, C. Telangiectasia Vessel Detection, D. Atypical Pigment Network Detection, E. Salient Point Detection, G. Specific Colors and H. Hair Detection. These features are applied to the outside-lesion skin area which is defined as the entire image with two areas removed: lesion area and corner area. If no area remains after these areas are removed, all six features are zero.

The outside-lesion area shows features such as fair background skin and large blood vessels, both indicative of a tendency to develop skin cancers. The information is obtained from FIG. 2, upper right, such a large vessel outside the lesion, which raises the probability that the patient is prone to have such a skin cancer. Another feature obtained from the outside-lesion area is hair density. If the hair inside the lesion is more dense (greater numbers of long hairs), a benign lesion is more likely. This calculation depends on hair density outside the lesion. Thus, diagnostic information from non-lesional skin as well as the lesion itself is utilized. That non-lesional skin provides diagnostic information is confirmed by heat maps.

Figure 11A:
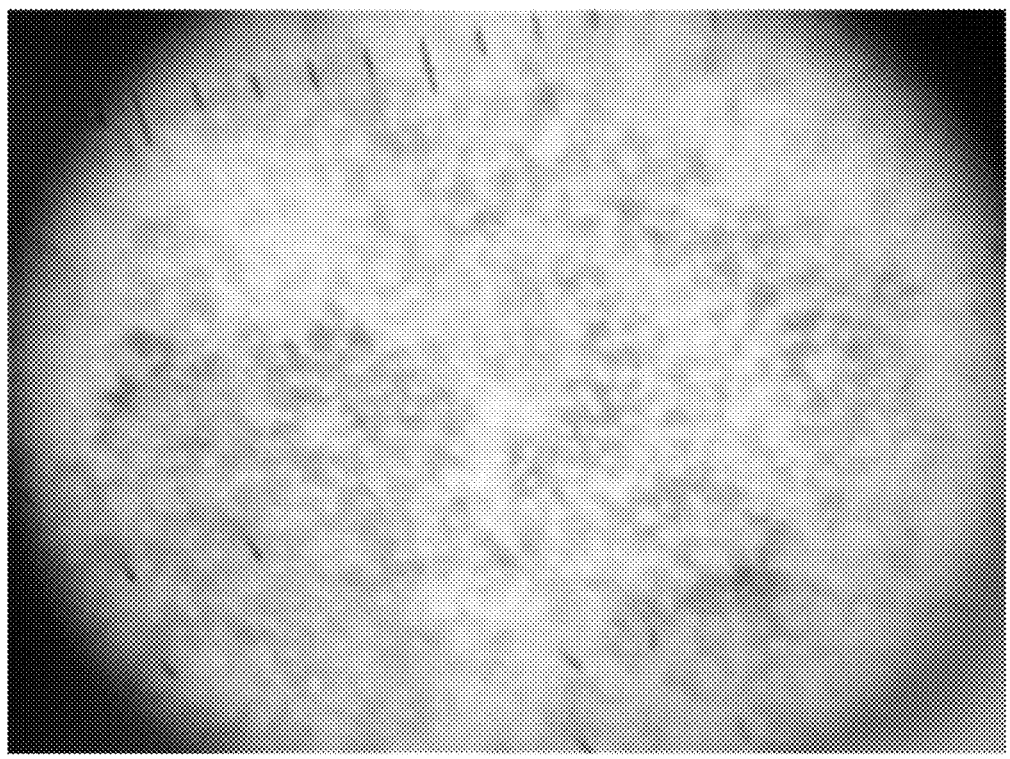
FIG. 11A shows a lesion with dark corners.
Figure 11B:
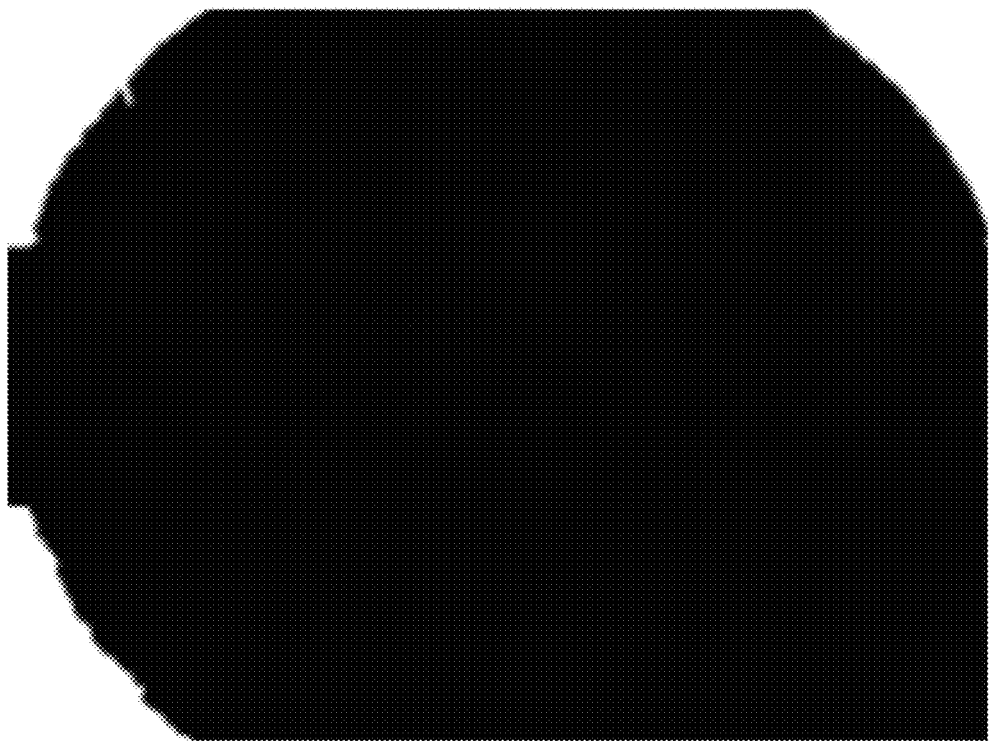
FIG. 11B shows automatic detection of the dark corner mask.

In calculating outside-lesion skin area, dark corners are excluded. A dark corner is defined as a region, within a distance of 5d pixels from an image corner, where intensity value of a grayscale image is less than 1.5d. This threshold is determined by histogram analysis of samples with dark corners in the training and the test set. All holes in that region are filled. A sample image with three dark corners is shown in FIG. 11A and the dark corner mask is shown in FIG. 11B. The outside-lesion skin area is defined as the area of the image that is not in the dark corner and not in the lesion.

Deep Learning Networks

Figure 6:
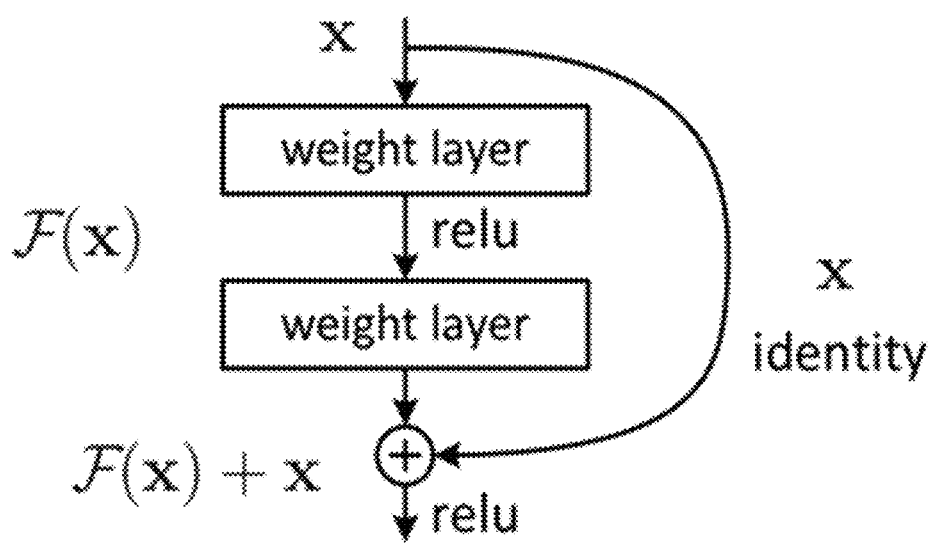
FIG. 6 is an illustrative diagram depicting a residual block, in accordance with embodiments of the disclosure.

In various embodiments, the method includes using a deep learning (DL) technique which may rely upon transfer learning of a deep residual network or ResNet. A ResNet DL architecture may be created to correctly classify 1000 objects and may have a "top-5 error" of 3.6%. In some embodiments, the method includes using a ResNet that is a convolution-based architecture. In some embodiments, the method includes using bicubic interpolation to reduce resolution (e.g., with an input matrix being a 224×224 RGB image). In some embodiments, the method includes following the input matrix by a sequential series of dimensionally increasing residual blocks (e.g., as shown in FIG. 6), which may result in a feature vector (e.g., a 2048 feature vector). According to certain embodiments, the method includes feeding the feature vector to a fully connected network whose final output consists of a plurality of (e.g., 1000) nodes. In various embodiments, the method includes using a SoftMax operation for final classification.

In various embodiments, the method includes using a ResNet model, such as ResNet-152 (e.g., one consisted of 152 residual blocks and/or required more than 1.28 million images over a period of weeks using 8 graphical processing units). In some embodiments, the method includes using ResNet-50, which is a variation of ResNet-152, in that ResNet-50 removes the 1×1×2048 convolution operation from final convolution layer (conv5.x) and repeating conv3 and conv4 only 4× and 6× respectively. In some embodiments, the method includes adapting an open-source implementation of pre-trained ResNet model (e.g., ResNet-50), such as one found in many DL libraries such as Tensorflow and PyTorch.

In various embodiments, the method includes training the DL model (e.g., the ResNet-50) in a training phase to learn convolutional kernels for producing the features helpful in distinguishing between objects (e.g., 1000 objects). In various embodiments, the method includes transfer learning or knowledge transferring, which may include applying knowledge a model learned while being trained to perform a particular task and utilizing it to perform another task (e.g., an unrelated task). In some embodiments, the kernels of a convolution DL model may be used to deduce the correct classification if applied to a different domain. For example, knowledge transferring may help diagnose pigmented skin lesions, by possibly requiring fewer images to train the DL network compared to training without knowledge transferring. Further learning using the trained network, by convention, is called fine-tuning the DL network. In some embodiments fine-tuning a model includes continuously training a model using an image set the model is to classify. That image set may be significantly different than the one used to train the original model. Additionally, fine tuning can be performed by selectively freezing learning on specific layers or sections of the model, which will bias the model learning to focus on fine tuning the feature-finding selections of the model or the classification portions of the model.

In various embodiments, the DL architectures (e.g., the ResNet-50) used by the method may include an input stage, a feature finding stage, and a classifier stage. In some embodiments, the DL architecture used by the method was originally designed and/or trained to have a classifier to distinguish 1000 objects. In certain embodiments, using the ResNet in a transfer learning setting may be limited to image dimensions of 224×224×3 at the input stage. In some embodiments, changing network connections and/or retraining of the model may be performed for non-standard image dimensions (e.g., 224×224×3). In various embodiments, the method includes transfer learning to reduce the amount of data needed and the time required to train a DL model, such as to avoid a full retraining. In some embodiments, modifying the feature finding stage is disabled to avoid the need to retrain the model with a large data set. In various embodiments, the method includes redefining the classifier stage to reflect the proposed problem, such as to define only two classes instead of 1000 classes. In other implementations, EfficientNet or DenseNet may are employed.

Examples of Classifier Implementation

A. First Image Database

In one example, a first image database (e.g., NIH) includes 1636 dermoscopy images, such as sample images of pigmented lesions (e.g., from clinics running dermoscopy studies)). The images have been acquired using digital cameras (e.g., Nikon DSC-W70) and DermLite Fluid dermatoscopes (e.g., 3Gen LLC, San Juan Capistrano, Calif.

92675) and have been reduced to resolution of 1024×768 pixels. The 1636 dermoscopy images include 367 melanomas, of which 228 may be at the in-situ stage, and 1269 non-melanoma lesions including 155 lentigines, 6 seborrheic keratoses, 204 congenital nevi, and 589 dysplastic nevi (446 mild atypia, 137 moderate atypia, and 6 severe atypia), 309 nevi without clinical atypia, many followed with mole monitoring, and 6 miscellaneous diagnoses. All images of melanomas are of melanomas biopsied and reviewed by two pathologists. All non-melanoma images are of non-melanoma lesions confirmed benign by biopsy and histopathology or confirmed by dermoscopy. A majority of melanomas are at the early in situ stage, some as small as 2 mm. The benign lesions include lentigines and seborrheic keratoses. Acral lesions and non-melanoma skin cancers are excluded.

B. Second Image Database

In one example, a second image dataset (e.g., publicly available HAM10000 dataset) includes 10015 images which are modified to exclude non-melanoma skin cancers and precancers, in order to have a binary decision model for both databases. The result is a curated HAM10000 dataset of 9174 lesions including 1099 benign keratoses, 115 dermatofibromas, 1113 melanoma, 6705 melanocytic nevi, and 142 vascular lesions. HAM10000 images are of size 450× 600 pixels. In a preprocessing step, the images are center cropped to create a square image of size 450×450 and further processed with a color correction step.

C. Classifier Results for Handcrafted Features and DL Features

In some embodiments, the method includes using the feature vectors of each of the six image processing modules including median split of colors, atypical pigment network, salient points, white color, pink colors, and vascular blush, along with the features from the clinical information module to create seven individual logistic regression models. The logistic regression function is defined as:

$$\varphi(z) = \frac{1}{1 + e^{-z}} \text{ where } z = W^T X \quad (1)$$

where the feature vector is assigned X, while W contains the associated weights for X. In certain embodiments, a handcrafted feature component (e.g., of an image analyzer) includes a median color splitting model for separating the image into a plurality of color regions, a vessel detection model for detecting elevated vascularity, an atypical pigment network detection model for identifying a pigment network whose structure varies in size and shape, a salient point detection model for detecting salient points based on an intensity plane of the image, and/or a color detection model for detecting at least one of a white area, a pink shade, a pink blush, and a semi-translucency. In some examples, all models are implemented in an image diagnosis process (e.g., an automatic process). In certain examples, one or more features extracted by one or more of the models are not used in the image diagnosis process. For example, a feature that does not provide pertinent information for a target disease is omitted from the image diagnosis process. In another example, a feature can be omitted from the image diagnosis process for a linear discriminant analysis using a large number of images.

In some embodiments, all of the features obtained from the hair model above, including length, width, length-to-width ratios, and color features, are used to provide additional diagnostic information in a sixth image processing model.

In some embodiments, all six image processing models are applied to the area of the lesion that is skin outside the lesion border and not in the dark corner area. The skin finder is applied and the corner eliminator is applied to avoid shadows and vignetting artifact. The seven outside-the-border modules supply additional information to the classifier.

The desired hypothesis is achieved by minimizing equation (2) using an iterative gradient approach.

$$E_{in} = \frac{1}{N} \sum_{n=1}^{N} \log\left(1 + e^{-y_n W^T X_n}\right) \quad (2)$$

where N is the number of samples, $y_i$ is either one or zero for positive and negative set respectively.

Feature selection from the original feature vector and any possible two-way interactions between feature elements was performed using the $\chi^2$ measure. Using the significant selected feature elements (p≤0.05), a logistic regression model for each module was crafted. The performance of the individual models is summarized in Table 1.

TABLE I

FEATURE MODEL PERFORMANCES

| Model | #Feature count | AUC-NIH | AUC-ISIC |
|---|---|---|---|
| Vessels-telangiectasia | 11 | 0.71 | *0.67 |
| Network: APN | 52 | 0.81 | 0.86 |
| Salient points | 7 | 0.63 | 0.76 |
| Vasc. blush semi-trans. | 63 | 0.73 | 0.83 |
| Pink shades | 150 | 0.70 | 0.84 |
| Median split | 264 | 0.79 | 0.87 |
| Resnet50PCA | 1024 | 0.83 | 0.88 |
| Demographic | 9 | 0.86 | — |
| HC Ensemble | NIH = 7, ISIC = 6 | 0.90 | 0.86 |
| HC + DL Ensemble | NIH = 8, ISIC = 7 | 0.94 | 0.90 |

Notes for Table I:
HC: handcrafted, DL: deep learning, HC + DL: fusion of CH + DL, AUC: Area under the receiver operating characteristic curve
*The only AUC to fall with the new ISIC 2018 Task 3 dataset The feature vector used ResNet-50 which has 2048 elements (differs significantly from Codella's 1000 elements), which are extracted from the point just preceding the fully connected (FC) network (instead of from the output of the FC network as for Codella's), without any fine tuning.

To reduce dimensions, a principal component transform (PCT) was used; the first 1024 principal components were selected. Logistic regression was performed on the transformed feature vector and the area under the receiver operating curve (AUC) for the resulting DL model was 0.83.

All six original handcrafted image models and the demographic model were assembled into a fusion model, using methods used to build individual models, each model yielding a single feature. This resulted in an AUC of 0.90.

φ(z) using the same methodology as before, the fusion model adds one more feature to the logistic regression model: the probability output for the deep learning arm. This fusion of handcrafted and DL-based features resulted in an AUC of 0.94, performing better than either model alone.

Results

Figure 7:
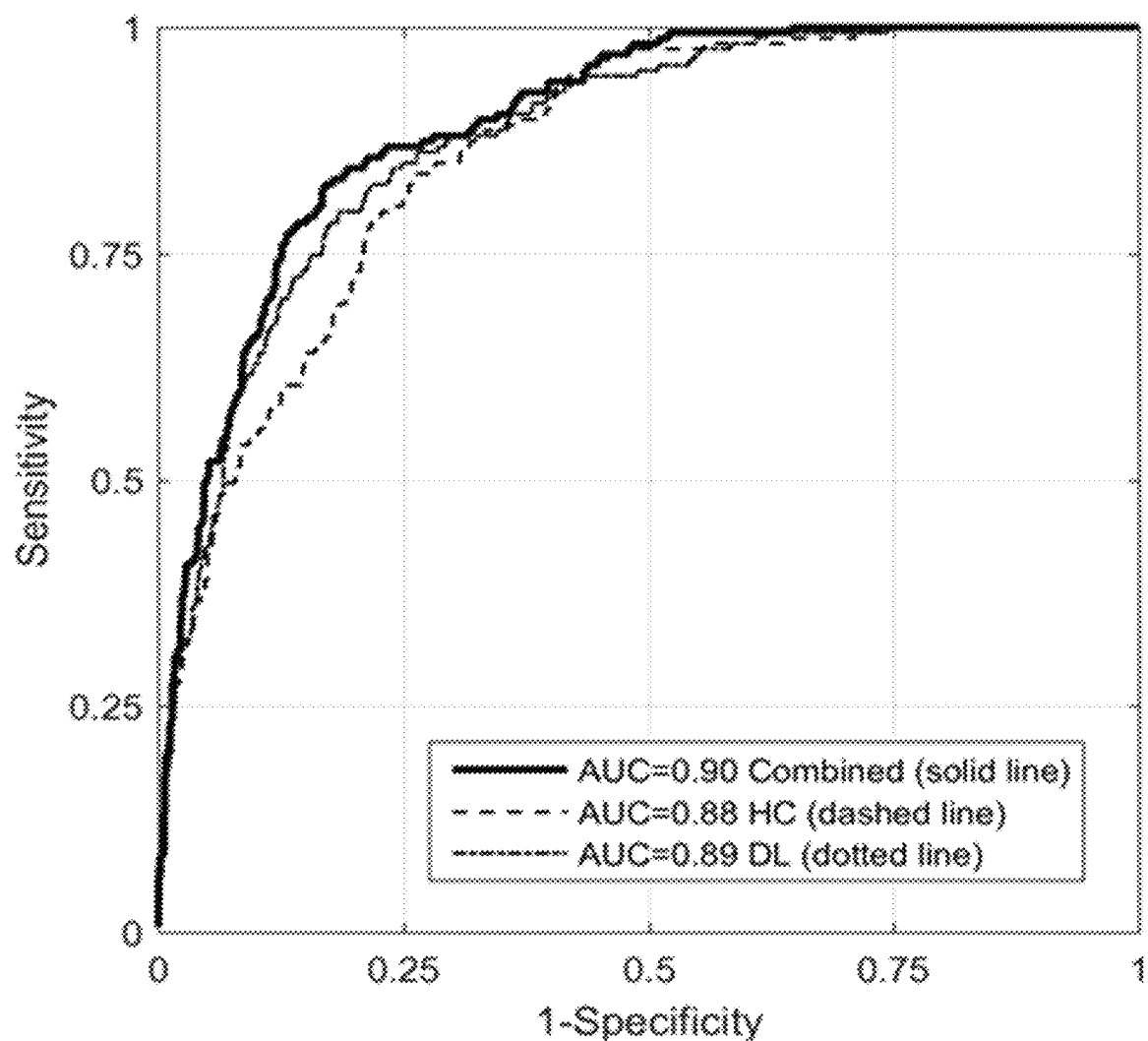
FIG. 7 shows a Receiver Operating Characteristic (ROC) curve for a handcrafted (HC) technique, a deep learning (DL) technique, and a combined technique, in accordance with embodiments of the disclosure.

FIG. 7 shows a Receiver Operating Characteristic (ROC) curve for the ensembled handcrafted model (HC), the ResNet50 model (DL), and a combined (HC+DL) model for the HAM10000 data set (e.g., the second image database). As shown, the combined model (fusion of HC and DL) shows that inclusion of classical handcrafted image processing feature along with the DL feature resulted in a better performing model, increasing the AUC from 0.89 without the HC features to 0.90 with their inclusion. As shown in Table I, for the NIH database, improvement is even greater, with AUC increasing from 0.83 without the HC features to 0.94 with their inclusion As shown in FIG. 7, the method according to embodiments of the invention, which fuses deep learning and handcrafted features, results in higher diagnostic accuracy. For example, the ROC area improved over the DL results alone from 0.89 to 0.90 and improved over the HC results along from 0.86 to 0.90. In some embodiments, the combined image processing method leads to improved results at least partly owing to the DL image processing and HC image processing results have different error profiles. In various embodiments, the disclosed method includes medically relevant features in the HC model with automation where the feature selection process is data-driven, such as with only significant features (e.g., p=0.05) in the multivariate logistic regression model retained. In various embodiments, the disclosed method includes processing high difficulty image sets, such as an image set with melanoma in situ to invasive melanoma ratio of 1.64:1. In some embodiments, the disclosed method uses at least some manual borders. In certain embodiments, the disclosed method uses at least some automatic borders, such as fully automatic borders. In various embodiments, the method includes using a high-resolution (e.g., higher than 224 pixel width image) transfer network.

Digital Dermoscopy Systems

Figure 8:
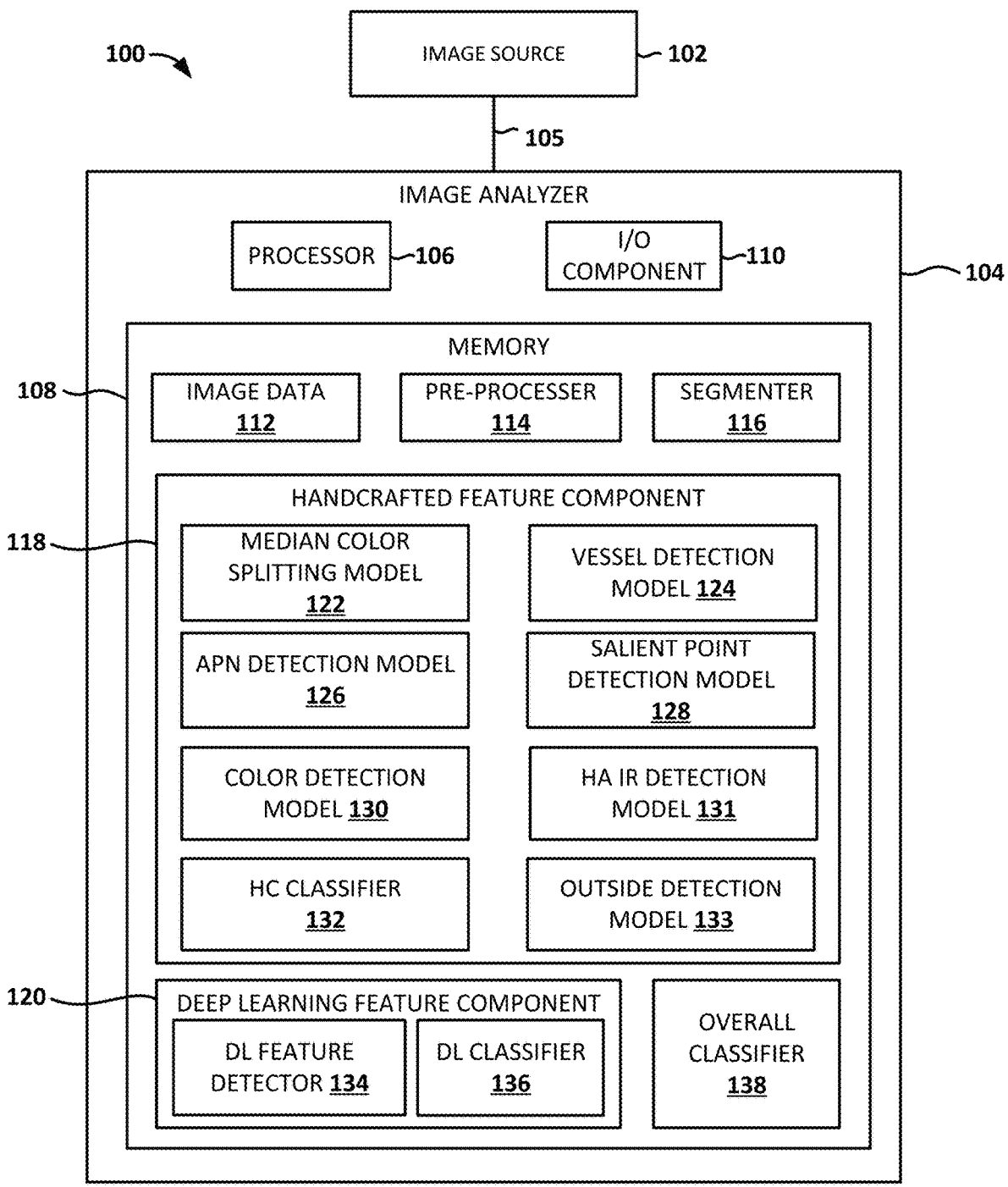
FIG. 8 is a block diagram of an illustrative digital dermoscopy system, in accordance with embodiments of the disclosure.

FIG. 8 depicts an illustrative digital dermoscopy system 100 in accordance with embodiments of the disclosure. The digital dermoscopy system 100 includes an image source 102 that is communicably coupled to an image analyzer 104. In embodiments, the image analyzer 104 receives an image 112 from the image source 102 and analyzes the image 112 to facilitate diagnosis of a skin affliction such as, for example, BCC, SCC, or melanoma. Exemplary images include, but are not limited to, digital photographs, digital image files from medical imaging, machine vision image files, and/or the like. In embodiments, for example, the image source 102 may include a digital camera with an add-on device for 10-power magnification, and/or any other device with magnification within the range of 8-30 power. These devices may include, but are not limited to, the Canfield Epilight, Canfield Imaging Systems, Fairfield, N.J.; the 3Gen DermLite II Pro, 3Gen LLC, Dana Point, Calif.; the Heine Dermaphot, Heine Dermaphot Optics, Heine Ltd, Herrsching, Germany; and/or LED rings (3Gen Imaging, Dana Point, Calif., FotoFinder Teachscreen Software GmbH, Bad Birnbach, Germany). In embodiments, the image source 102 may be a computing device having a memory in which the image is stored.

As shown in FIG. 8, the image source 102 may be communicably coupled to the image analyzer 104 by a communication link 105. In embodiments, the image source 102 communicates an image over the communication link 105. In embodiments, the communication link 105 may be, or include, a wired communication link such as, for example, a USB link, a proprietary wired protocol, and/or the like. The communication link 105 may be, or include, a wireless communication link such as, for example, a short-range radio link, such as Bluetooth, IEEE 802.11, a proprietary wireless protocol, and/or the like. In embodiments, for example, the communication link 105 may utilize Bluetooth Low Energy radio (Bluetooth 4.1), or a similar protocol, and may utilize an operating frequency in the range of 2.40 to 2.48 GHz.

The term "communication link" may refer to an ability to communicate some type of information in at least one direction between at least two devices, and should not be understood to be limited to a direct, persistent, or otherwise limited communication channel. That is, according to embodiments, the communication link 105 may be a persistent communication link, an intermittent communication link, an ad-hoc communication link, and/or the like. The communication link 105 may refer to direct communications between the image source 102 and the image analyzer 104, and/or indirect communications that travel between the image source 102 and the image analyzer 104 via at least one other device (e.g., a repeater, router, hub, and/or the like). The communication link 105 may facilitate uni-directional and/or bi-directional communication between the image source 102 and the image analyzer 104. In embodiments, the communication link 105 is, includes, or is included in a wired network, a wireless network, or a combination of wired and wireless networks. Illustrative networks include any number of different types of communication networks such as, a short messaging service (SMS), a local area network (LAN), a wireless LAN (WLAN), a wide area network (WAN), the Internet, a peer-to-peer (P2P) network, or other suitable networks. The network may include a combination of multiple networks. In embodiments, for example, the image analyzer 104 may be accessible via the Internet (e.g., the image analyzer 104 may facilitate a web-based image analysis service), and a user may transmit an image, via the image source 102, to the image analyzer 104 for diagnostic services.

As shown in FIG. 8, the image analyzer 104 is implemented on a computing device that includes a processor 106, a memory 108, and an input/output (I/O) device 110. Although the image analyzer 104 is referred to herein in the singular, the image analyzer 104 may be implemented in multiple instances, distributed across multiple computing devices, instantiated within multiple virtual machines, and/or the like. In embodiments, the processor 106 executes various program components stored in the memory 108, which may facilitate analyzing the image 112. In embodiments, the processor 106 may be, or include, one processor or multiple processors. In embodiments, the I/O component 110 may be, or include, one I/O component or multiple I/O components and may be, or include, any number of different types of devices such as, for example, a monitor, a keyboard, a printer, a disk drive, a universal serial bus (USB) port, a speaker, pointer device, a trackball, a button, a switch, a touch screen, and/or the like. Alternatively, or additionally, the I/O component 110 may include software and/or firmware and may include a communication component configured to facilitate communication via the communication link 105, and/or the like.

According to certain embodiments, as indicated above, various components of the digital dermoscopy system 100, illustrated in FIG. 8, may be implemented on one or more computing devices. A computing device may include any type of computing device suitable for implementing embodiments of the invention. Examples of computing devices include specialized computing devices or general-purpose computing devices such as "workstations," "servers," "laptops," "desktops," "tablet computers," "hand-held devices," and the like, all of which are contemplated within the scope of FIG. 9 with reference to various components of the digital dermoscopy system 100. For example, according to embodiments, the image analyzer 104 (and/or the image source 102) may be, or include, a general purpose computing device (e.g., a desktop computer, a laptop, a mobile device, and/or the like), a specially-designed computing device (e.g., a dedicated video encoding device), and/or the like. Additionally, although not illustrated herein, the image source 102 may include any combination of components described herein with reference to the image analyzer 104, components not shown or described, and/or combinations of these.

In certain embodiments, a computing device includes a bus that, directly and/or indirectly, couples the following devices: a processor (e.g., the processor 106), a memory (e.g., the memory 108), an input/output (I/O) port, an I/O component (e.g., the I/O component 110), and a power supply. Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally, any number of these components, or combinations thereof, may be distributed and/or duplicated across a number of computing devices.

In certain embodiments, memory (e.g., the memory 108) includes computer-readable media in the form of volatile and/or nonvolatile memory and may be removable, non-removable, or a combination thereof. Media embodiments include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; or any other medium that can be used to store information and can be accessed by a computing device such as, for example, quantum state memory, and the like. In embodiments, the memory (e.g., the memory 108) stores computer-executable instructions for causing the processor (e.g., the processor 106) to implement aspects of embodiments of system components discussed herein and/or to perform aspects of embodiments of methods and procedures discussed herein. Computer-executable instructions may include, for example, computer code, machine-useable instructions, and the like such as, for example, program components capable of being executed by one or more processors associated with a computing device. Embodiments of such program components include a pre-processing component 114, a segmenter 116, a handcrafted feature component 118, a deep learning feature component 120, and/or an overall classifier 138. Program components may be programmed using any number of different programming environments, including various languages, development kits, frameworks, and/or the like. Some or all of the functionality contemplated herein may also, or alternatively, be implemented in hardware and/or firmware.

In embodiments, the pre-processing component 114 may be configured to pre-process (e.g., when executed by processor 106) an image 112 for segmentation. The pre-processing component 114 may be configured to detect and remove noises from the image such as, for example, portions of the image 112 that represent hairs, ruler markings, dark corners and/or the like. In embodiments, the pre-processing component 114 may use any number of different techniques for removing noise such as, for example, by applying an adaptive threshold for grayscale or red image morphological closing, using an area opening filter, and applying noise removal strategies. Illustrative hair-removal techniques, among other techniques for detection of dermoscopy features, are described in U.S. Pat. No. 7,689,016, filed May 30, 2006, by William V. Stoecker et al., and entitled "AUTOMATIC DETECTION OF CRITICAL DERMOSCOPY FEATURES FOR MALIGNANT MELANOMA DIAGNOSIS," the entirety of which is hereby incorporated herein by reference for all purposes.

In embodiments, the segmenter 116 may be configured to segment (e.g., when executed by processor 106) the pre-processed image into a number of segments, such as defined by a lesion mask, and the post-processing component 120 may further refine the segmentation to facilitate more accurate classification of BCC and/or other types of skin lesions, including but not limited to SCC and melanoma. The segments may include, for example, objects, groups, slices, tiles, and/or the like. The segmenter 116 may employ any number of various automatic image segmentation methods known in the field. In embodiments, the segmenter 116 may use image color and corresponding gradients to subdivide an image into segments that have similar color and texture. Embodiments of image segmentation techniques include gradient vector flow (GVF) contours, watershed segmentation, statistical region merging (SRM), deep learning techniques, thresholding-based techniques, entropy-based techniques, variance-based techniques, and geodesic active contours (GAC).

In various embodiments, the system 100 includes a handcrafted feature component 118, a deep learning feature component 120, and an overall classifier 138. In some embodiments, the handcrafted feature component 118 is configured to provide a first analysis result (e.g., a first determination decision or prediction of melanoma), the deep learning feature component 120 is configured to provide a second analysis result (e.g., a second determination decision or prediction of melanoma), and the overall classifier 138 is configured to provide an overall analysis result (e.g., an overall determination decision or prediction of melanoma) based on the first and second analysis results.

In some embodiments, the handcrafted feature component includes a median color splitting model 122, a vessel detection model 124, an atypical pigment network detection model 126, a salient point detection model 128, a color detection model 130, hair detection model 131, outside-lesion detection model (all image features applied to the area outside the segmented area) 133, (and a manual (or handcrafted) classifier 132. In certain embodiments, the median color splitting model 122 is configured for (e.g., when executed by the processor 106) separating the image into a plurality of color regions. In certain embodiments, the vessel detection model 124 is configured for (e.g., when executed by the processor 106) detecting elevated vascularity, such as for detecting vessels that are narrow and red. In some embodiments, the vessel detection model 124 is configured for (e.g., when executed by the processor 106) filtering bubbles.

In certain embodiments, the atypical pigment network detection model 126 is configured for (e.g., when executed by the processor 106) identifying a pigment network, whose structure may vary in size and shape. In some embodiments, the atypical pigment network detection model 126 is configured for (e.g., when executed by the processor 106) detecting areas having relatively high variance in the red and relative-red color planes. In certain embodiments, the atypical pigment network detection model 126 is configured for (e.g., when executed by the processor 106) determining asymmetry based on eccentricity of detected blocks. In certain embodiments, the atypical pigment network detection model 126 is configured for (e.g., when executed by the processor 106) applying a green-to-blue ratio threshold to remove false positive granular structures detected as atypical pigment network. The removed blocks may be retained and size-filtered in the blue plane to find small blue-gray peppering (granularity). As granularity is a strong indicator of early melanoma, detecting this granularity allows for early diagnosis of melanoma (see, e.g., Stoecker et al. (2011), Computerized Medical Imaging and Graphics, 35:144-147.

In various embodiments, the salient point detection model 128 is configured for (e.g., when executed by the processor 106) detecting salient points, such as based on an intensity plane of an intensity version of an image (e.g., that is being processed). In some embodiments, detecting salient points includes smoothing an intensity version of the image with a Gaussian filter to remove noise. In certain embodiments, the Gaussian filter has an optimal sigma value of 1.02.

In various embodiments, the color detection model 130 is configured to detect a pink shade and/or a pink blush (e.g., semi-translucency). In some embodiments, the pink shade may be dark pink, light pink, or pink-orange. In some embodiments, the manual classifier 132 is configured to provide the first analysis result, such as based on the features detected by one or more the median color splitting model 122, the vessel detection model 124, the atypical pigment network detection model 126, the salient point detection model 128, and the color detection model 130.

In some embodiments, the deep learning feature component 120 includes a deep learning (DL) feature detector 134 and an automatic (DL) classifier 136. In various embodiments, the DL feature detector 134 is configured for (e.g., when executed by the processor 106) automatically detecting melanoma and other skin cancer features. In various embodiments, the DL feature detector is a repurposed pre-trained ResNet model, such as one repurposed via transfer learning. In certain embodiments, the automatic classifier is configured to provide the second analysis result.

Figure 9:
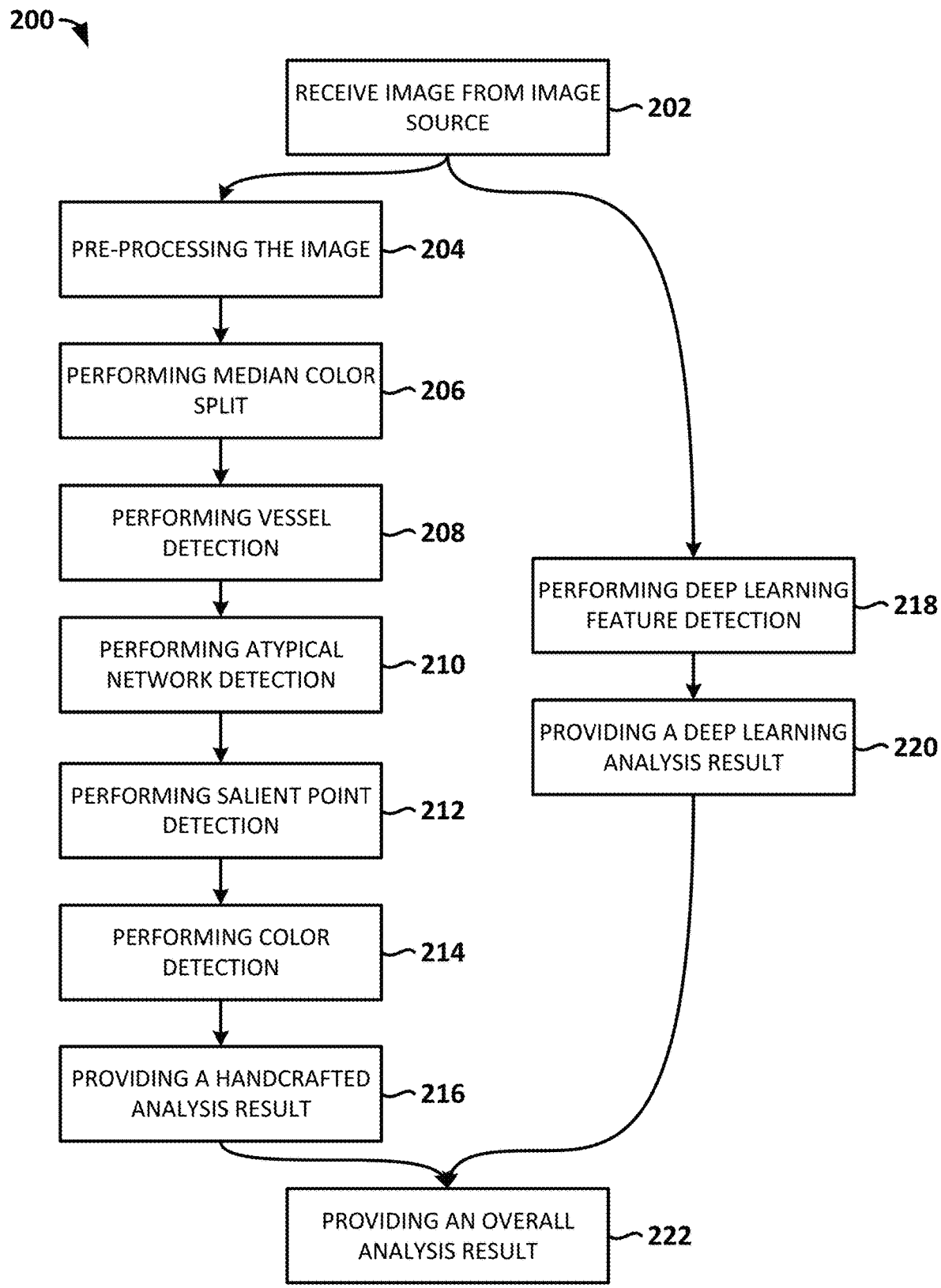
FIG. 9 is a flow diagram depicting an illustrative method of diagnosing melanoma and other skin cancers in dermoscopy images, in accordance with embodiments of the disclosure.

The illustrative digital dermoscopy system 100 shown in FIG. 8 is not intended to suggest any limitation as to the scope of use or functionality of embodiments of the present disclosure. Any image source may be used. Neither should the illustrative digital dermoscopy system 100 be interpreted as having any dependency or requirement related to any single component or combination of components illustrated therein. Additionally, any one or more of the components depicted in FIG. 8 may be, in embodiments, integrated with various ones of the other components depicted therein (and/or components not illustrated), all of which are considered to be within the ambit of the presently disclosed subject matter. Additionally, the methods embodied here may be applied to any skin image obtained by photographic means, including close-up photographic images FIG. 9 is a flow diagram depicting an illustrative method 200 of diagnosing melanoma in dermoscopy or other images, in accordance with embodiments of the disclosure. Embodiments of the method 200 may be performed by aspects of the illustrative digital dermoscopy system 100 depicted in FIG. 8. As shown in FIG. 9, embodiments of the method 200 include receiving an image from image source (block 202), pre-processing the image (block 204), performing median color split (block 206), performing vessel detection (block 208), performing atypical network detection (block 210), performing salient point detection (block 212), performing color detection (block 214), providing a handcrafted analysis result (block 216), performing deep learning feature detection (block 218), providing a deep learning analysis result (block 220), and/or providing an overall analysis result (block 222). In some embodiments, the image received at step 202 may be from an image source 202 which may include a digital imaging device such as, for example, a digital camera having an adapter that facilitates magnification.

In various embodiments, pre-processing the image 204 (block 204) includes identifying and removing hair noise from the image. In certain embodiments, performing median color split (block 206) includes separating the image into a plurality of color regions. In some embodiments, performing vessel detection (block 208) includes detecting elevated vascularity, such as detecting vessels that are narrow and red. In various embodiments, performing vessel detection (block 208) includes filtering bubbles on the image. In various embodiments, performing atypical network detection (block 210) includes identifying a pigment network whose structure varies in size and shape. In some embodiments, performing atypical network detection (block 210) includes determining asymmetry based on eccentricity of detected blocks on the image. In some embodiments, performing salient point detection (block 212) includes detecting salient points based on an intensity plane of an intensity version (e.g., an intensity image, or an image with intensity planes) of the image. In some embodiments, detecting salient points includes smoothing an intensity version of the image with a Gaussian filter to remove noise. In various embodiments, performing color detection (block 214) includes detecting a pink shade (e.g., light pink, dark pink, or pink-orange), and/or a pink blush (e.g., semi-translucency). In various embodiments, providing a handcrafted analysis result (block 216) includes using a manual (e.g., HC) classifier (e.g., HC classifier of FIG. 8) based on features determined in block 206, block 206, block 208, block 210, block 212, and/or block 214.

In some embodiments, performing deep learning feature detection (block 218) includes automatically detecting melanoma and other skin cancer features. In some embodiments, providing a second analysis result (block 220) includes using an automatic (e.g., DL) classifier (e.g., DL classifier of FIG. 8) based on the automatically detected melanoma and other skin cancer features (e.g., detected in block 218). In certain embodiments, providing an overall analysis result (block 222) is based on the first analysis result and the second analysis result.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Isodata and Otsu techniques may be substituted for Li and Shanbhag techniques, respectively. Further, methods which can successfully segment BCC can be applied to any skin cancer or any skin lesion of any type, including benign lesions. Thus, descriptions of the method which recited BCC specifically are to be regarded as illustrative, as they can apply to and be extended to any skin cancer and any benign lesion. Accordingly, the scope of the present disclosure is intended to embrace all such alternatives, modifications, and variations as fall within the scope of the claims, together with all equivalents thereof.

White Area Features

In various embodiments, the method 200 includes performing white area detection, which may be an additional handcrafted analysis technique or part of block 214 of performing color detection. For example, white area detection may be performed by the color detection model 130. In some embodiments, performing white area detection includes identifying and/or analyzing white areas outside a lesion boundary and/or inside the lesion boundary. In certain embodiments, performing white area detection includes identifying white area features, such as size, quantity, lesion decile ratios, location, eccentricity, dispersion, and/or irregularity of the white area. In some embodiments, performing white area detection includes automatically marking white area on an image based on average RGB value and/or converting the marked image into a binary mask for separation of the white area (e.g., via multiplication with the color image).

In various embodiments, training for detection of white area features includes manually marking lesion areas (e.g., using a second order spline technique), which may be followed by a verifying performed by an expert (e.g., dermatologist). In certain embodiments, detecting white area features includes generating a binary mask, such as a mask with a gray value of 2 assigned for the lesion, gray value of 1 assigned for the boundary (e.g., one-pixel-wide), and a gray value of 0 assigned for the rest of the image. In some embodiments, detecting white area features includes manually marking white areas, such as by techniques substantially similar to manually marking of the lesion areas described above (e.g., using a second order spline technique). The certain embodiments, determining white area features includes multiplying the lesion binary mask with its corresponding image to isolate the white areas inside the lesion and to perform white area analysis or detection inside the lesion and/or outside the lesion, such as separately. In some embodiments, determining white area features includes multiplying the white area binary mask with its corresponding image to separate the white areas.

In some embodiments, determining white area features includes determining threshold values, such as threshold values of red, green, and blue for marking white areas for an image. In certain embodiments, determining threshold values is performed for each image and may lead to each image having different threshold values. In various embodiments, determining the threshold values includes plotting histograms of the red, green and blue planes of an image, which may indicate the color distribution and/or number of pixels of certain color values in the image. In some embodiments, determining the threshold values includes marking the total number of white areas, starting a counter in the histogram of the marked white areas from a lowest gray level value (e.g., predetermined), stopping the counter when the count is equal to 80% of the total pixels of the marked white areas, wherein the gray level value at which counting stops may be the gray level value corresponding to the 20% brightest pixels. This process may be repeated for each of the three color (e.g., red, green, blue) planes.

In certain embodiments, determining the threshold values further includes calculating average values for all the color planes and calculating standard deviation of color plane values, such as for each lesion. In various embodiments, calculating the average values includes summing the color plane values of all lesion pixels and dividing it by the total number of pixels. In some embodiments, calculating the standard deviation includes using the built-in function in Excel by entering all the values in the spreadsheet or using the built-in function in Matlab® or in other programming environments, including OpenCV and python. In certain embodiments, determining threshold values includes using the histogram and the average color plane value. For example, determining the threshold values includes setting a value corresponding to the top 20% brightest pixels be A, setting an average value of a given image be B, and setting the standard deviation value of the image be C.

In some embodiments, Diff=A−B, where Diff is the difference between the value corresponding to the top 20% brightest pixels and average value of lesion and Ratio=Diff/C. In various embodiments, determining threshold values includes determining an average value and/or a standard deviation of each Ratio values for each lesion. In certain embodiments, determining the threshold values includes selecting an initial threshold value by summing the average value of the image plus the average value of the Ratio, such as for each given color plane. In various embodiments, determining the threshold values includes manually adjusting the initial threshold value, such as to increase accuracy. Such procedure may be repeated for all three color planes, which may lead to observing three different threshold values. Such threshold determining procedure may be applied to determine separate values for inside the lesion and/or outside the lesion. As an example, the threshold values may be selected to be Red plane=0.5; Green plane=1.1; and Blue plane=1.2.

In various embodiments, determining white area features includes marking (e.g., automatically) one or more pixels as white, such as when a pixel satisfies all three conditions of exceeding the threshold values of the three color planes: a) the red plane value of the pixel being greater than the sum of the average red value of the lesion and the red threshold times the red standard deviation of the lesion, b) the green plane value being greater than the sum of the average green value of the lesion and the green threshold times the green standard deviation of the lesion, and c) the blue plane value being greater than the sum of the average blue value of the lesion and the blue threshold times the blue standard deviation of the lesion. In some embodiments, determining white area features includes examining (e.g., automatically) each (e.g., and all) pixels in a given lesion against the three conditions and marking one or more pixels as white area when all three conditions are satisfied. In certain embodiments, only two of the three color planes are used for examining against.

White Area Features—Decile Features

In certain embodiments, determining white area features includes determining decile features, which includes determining interior decile features and/or determining exterior decile features. In some embodiments, determining interior decile features includes calculating a white area percentage or ratio for each decile, such as determining ten ratios for ten deciles. A decile used for determining interior decile features may be labeled starting from a lesion boundary and inwards. In some embodiments, determining exterior decile features includes calculating a white area percentage or ratio for each decile, such as determining ten ratios for ten deciles, with the decile used for determining exterior decile features labeled starting from the lesion boundary and outwards. In certain embodiments, when an image lesion occupies much of the image and it is not possible to accommodate all the deciles, a value is set for the decile percentage for the decile to be negative unity. In various embodiments, determining decile features includes calculating decile ratios by computing interior lesion deciles and exterior lesion deciles against each other. The decile method is an example and can be replaced with any method that divides the lesion area into inner-to-outer regions, such as quartile and quintile area determination.

White Area Globule Features

In various embodiments, determining white area features includes determining white area globule features (e.g., by running a globule feature code), which may include determining a binary feature mask, determining a lesion centroid co-ordinate, and determining lesion area. In certain embodiments, automatically detecting white area within a lesion includes determining an average eccentricity feature, a relative size of all white areas compared to lesion area, a relative size of largest white area compared to lesion area, an absolute size of the largest white area, a number of marked white areas per unit lesion area, an average border irregularity of all white areas, and/or a white area dispersement index. In some embodiments, the white area globule features are also computed inside the lesion and outside the lesion separately.

In some embodiments, average eccentricity of white areas:

$$E = \frac{D}{\sqrt{A}}$$

where D is the Euclidean distance between the global white area centroid and the lesion centroid and A is the area of the lesion.

In some embodiments, the relative size of white areas:

$$W_{rel} = (1/A) \sum_{i=1}^{n} W_i$$

where n is the number of white areas and $W_i$ is the area of the $i^{th}$ white area.

In some embodiments, the relative size of largest white area:

$$W_{rel\text{-}max} = \max\{i\} W_i/A$$

In some embodiments, the absolute size of largest white area:

$$W_{max} = \max\{i\} W_i$$

In some embodiments, the number of white areas normalized by lesion size:

$$\bar{n} = n/A$$

In some embodiments, the average border irregularity of all white areas:

$$\bar{I} = \sum_{i=1}^{n} \frac{P_i}{n\sqrt{W_i}}$$

where $P_i$ is the perimeter and $W_i$ is the area of the $i^{th}$ white area within the lesion.

In some embodiments, the white area dispersement index, $$DI = \sum_{i=1}^{n} \frac{DLC_i}{n\sqrt{A}}$$

where $DLC_i$ is the distance of the $i^{th}$ white area centroid from the lesion centroid and n is the number of white areas.

In some embodiments, determining white area features includes applying a logistic regression or logistic model or logit model, such as to help generate a best-fit model to differentiate melanoma and other skin cancers from benign lesions.

Atypical Pigment Network Detection

In various embodiments, performing atypical network (e.g., pigment network) detection (block 210), as a hand-crafted analysis technique, may include determining areas with highest variance in the red plane, which may help determine features such branch streaks, radial streaming, pseudopods, and thickened and irregular lines, all indicative of an irregular pigment network. In some embodiments, performing atypical network detection (block 210) includes automatically segmenting APN based on a variance in the red plane in a lesion area to help determine features such as morphology, color and texture of the segmented APN region.

In some embodiments, performing atypical network detection (block 210) includes receiving a skin image, such as a RGB dermoscopy image of a skin lesion and generating a melanoma and other skin cancer decision, which may be positive (e.g., melanoma and other skin cancer) or negative (e.g., benign lesion). For example, performing atypical network detection (block 210) may include receiving an RGB image, pre-processing an image, segmenting APN, extracting APN feature, classifying, and generating melanoma or skin cancer decision.

In various embodiments, pre-processing an image includes dividing the image into non-overlapping blocks, such as blocks of size 16 by 16 (pixels). In some embodiments, pre-processing the image may include removing hair artifacts, such as via automatically generating a hair mask. In some embodiments, pre-processing the image may include removing bubble areas. In certain embodiments, segmenting APN includes manually segmenting APN area, such as in a preliminary analysis.

In various embodiments, segmenting APN includes calculating red plane variance in a block size of 16 by 16 for the blocks that are within the lesion boundary, such as blocks that are not part of a hair mask. In some embodiments, segmenting APN includes calculating a threshold value, such as from the overall mean and standard deviation of the variance of each block. In certain embodiments, segmenting APN includes obtaining an intermediate APN mask, such as by applying the APN threshold over the blocks used for variance calculation. In various embodiments, segmenting APN includes calculating a green-to-blue ratio (e.g., which may be indicative of blue-gray granular areas) and may further include rejecting any part of the intermediate APN mask with a green-to-blue ratio of less than a target value (e.g., 1.1) to obtain a final APN mask.

In various embodiments, extracting APN features includes extracting morphological features, extracting texture features, and/or extracting color features, such as for the APN region in the lesion. In some embodiments, extracting morphological features of the segmented APN region includes extracting lesion area, APN area, ratio of APN area to lesion area, ratio of number of APN blocks to lesion area, ratio of number of APN blocks to number of APN blobs, centroid distance between APN mask centroid and lesion border mask centroid, lesion normalized centroid distance, total number of the outermost pixels of the lesion, ratio of lesion area to image area, APN normalized centroid distance, ratio of lesion perimeter to square root of lesion area, and/or ratio of lesion perimeter to square root of APN area. In certain embodiments, extracting APN features includes applying a median split algorithm. In some embodiments, extracting APN features includes extracting salient point features of the segmented APN region, which may include extracting salient point count in APN region, salient point count in APN region normalized by APN area, salient point count in APN region normalized by lesion area, salient point count in lesion area, and/or salient point count in lesion area normalized by lesion area.

In various embodiments, extracting texture features of the segmented APN region includes extracting first-order texture features, such as based on the gray-level histogram. For example, extracting texture features includes extracting histogram mean (e.g., indicative of the average brightness), histogram variance (e.g., indicative of the average contrast), smoothness index (e.g., indicative of the relative smoothness of the APN region), skewness index (e.g., indicative of the skewness of the histogram), uniformity index (e.g., indicative of the uniformity), and/or entropy (e.g., indicative of the information content of a message).

In various embodiments, extracting color features of the segmented APN region includes extracting average intensity of red color in APN region, average intensity of green color in APN region, average intensity of blue color in APN region, standard deviation of intensity of red color in APN region, standard deviation of intensity of green color in APN region, and/or standard deviation of intensity of blue color in APN region. In certain embodiments, extracting color features includes converting RGB images into HSV (hue, saturation, and value) planes and extracting HSV color features such as mean hue, hue variance, hue standard deviation, and/or hue dispersion.

Salient Point Detection

In various embodiments, performing salient point detection (block 212), as a handcrafted analysis technique, may include extracting candidate line points from a given image (e.g., image with a pigment network), which may include constructing one or more grayscale images of the given image. For example, the grayscale (e.g., binary) image may be a blue image, a CIE-XYZ image, an intensity image, a luminance image, or a first plane of a Principle Component Transform (PCT) image. Each grayscale image may include candidate line points. In some embodiments, extracting candidate line points includes linking candidate line points in each of the binary images, such as linking candidate line points in the lesion area of the image. In some examples, an intensity image chosen as the grayscale image is a single plane (e.g., intensity plane) constructed from the equation below:

$$\text{Intensity}=(R+G+B)/3.$$

In some embodiments, extracting candidate line points includes analyzing a pigment network in a given image as a curvilinear structure where a curve is considered as a one-dimensional manifold in a two-dimensional space with a width. In certain embodiments, extracting candidate line points includes performing Steger's 2D line extraction algorithm. For example, extracting candidate line points includes modeling the pigment network as a curve $s(t)$ that exhibits a characteristic 1D line profile in the direction perpendicular to the line perpendicular to $s'(t)$, denoting the direction perpendicular to $s'(t)$ as $n(t)$, wherein the first directional derivative vanishes in the direction of $n(t)$ and the second directional derivative has a large absolute value. In certain embodiments, extracting candidate line points includes computing the direction of the curve locally for each image point $I(x,y)$ and may include approximating the image at each point with the polynomial (e.g., Taylor polynomial) to smooth the image, reduce noise, and enable subpixel localization of line points. In some embodiments, extracting candidate line points includes symbolizing each subpixel location (px, py) of the line points and the direction (nx, ny) perpendicular to the line using vectors.

In some embodiments, linking candidate line points includes using a hysteresis operation, such as one modeled on Canny's edge detecting algorithm. For example, linking candidate line points includes assigning points on the image having a large absolute value of second directional derivative along (nx, ny) as salient line points. In certain embodiments, linking candidate line points includes constructing lines by adding one or more appropriate neighbors to any given line. Among eight possible neighboring pixels for each pixel, three that are compatible with the local direction of the line point are examined. The selection of appropriate neighbor to add to the line is based on the distance between the respective sub-pixel line locations and the angle difference of the two points. The algorithm continues to add the appropriate neighbors until there are no more line points in the current neighborhood or until the best matching neighbor is a point which is already added to a line. New lines are created as long as the starting point has a second directional derivative which lies below an upper threshold and above a lower threshold value which are user specified.

In various embodiments, extracting candidate line points includes selecting a best binary (e.g., grayscale) plane and determining a threshold. Selecting a best binary plane includes selecting a best binary image, such as based on the amount of salient points and/or the sigma value of the image. Determining a threshold may include setting the percentage of salient points in the total number of lesion points as the cutoff threshold for diagnosing melanoma and other skin cancers, wherein below the cutoff threshold indicates Clark's nevi being falsely diagnosed as melanoma cancers and above the cutoff threshold indicates melanoma being correctly diagnosed along with benign lesions falsely diagnosed as melanoma.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A system for identifying melanoma and other skin cancers in a dermoscopy image or other close-up skin image, the system comprising:
   an image analyzer having at least one processor that instantiates components stored in a memory, the components comprising:
      a segmenter configured to segment a lesion from the rest of the image,
      a handcrafted feature component including:
         a median color splitting model for separating the image into a plurality of color regions,
         a vessel detection model for detecting elevated vascularity,
         an atypical pigment network detection model for identifying a pigment network whose structure varies in size and shape,
         a salient point detection model for detecting salient points based on an intensity plane of the image, a color detection model for detecting at least one of a white area, a pink shade, a pink blush, and a semi-translucency, an outside-lesion model, obtained by applying at least one of the handcrafted component model features to the area outside the segmented area, and a manual classifier configured to provide a first analysis result, a deep learning feature component including: a deep learning feature detector for automatically detecting melanoma and other skin cancer features, and an automatic classifier configured to provide a second analysis result, and an overall classifier configured to provide an overall analysis result based on the first analysis result and the second analysis result.

2. The system of claim 1, wherein the handcrafted component further comprises a hair-detection model for detecting hair geometric and color features.

3. The system of claim 1, wherein the memory further includes a pre-processor configured for identifying and removing a noise from the image, the noise is selected from a group consisting of hair, ruler marking, bubble, and ink marking.

4. The system of claim 2, wherein the pre-processor is configured to scan a grayscale or red version of the image horizontally and vertically within the same row and column for hair patterns.

5. The system of claim 2, wherein the pre-processor is configured to position a hair mask to indicate where on the image hairs are to be removed.

6. The system of claim 1, wherein the vessel detection model is configured for detecting vessels that are narrow and red.

7. The system of claim 1, wherein the vessel detection model is further configured for filtering bubbles on the image.

8. The system of claim 1, wherein the atypical pigment network detection model is configured for detecting areas having relatively high variance in the red and relative-red color planes.

9. The system of claim 1, wherein the atypical pigment network detection model is configured for determining asymmetry based on eccentricity of detected blocks.

10. The system of claim 1, wherein the atypical pigment network detection model is configured for applying a green-to-blue ratio threshold to remove false positive granular structures detected as atypical pigment network.

11. The system of claim 1, wherein detecting salient points based on an intensity plane of the image includes smoothing an intensity version of the image with a Gaussian filter to remove noise.

12. The system of claim 10, wherein the Gaussian filter has an optimal sigma value of 1.02.

13. The system of claim 1, wherein the pink shade includes at least one of a dark pink, light pink, and a pink-orange.

14. The system of claim 1, wherein the deep learning feature detector is a repurposed pre-trained ResNet model repurposed via transfer learning.

15. The system of claim 1, wherein the color detection model is configured for identifying at least one of the white area features including an average eccentricity feature, a relative size of all white areas compared to lesion area, a relative size of largest white area compared to lesion area, an absolute size of the largest white area, a number of marked white areas per unit lesion area, an average border irregularities of all white areas, and a white area dispersement index.

16. The system of claim 1, wherein the color detection model is configured for automatically marking white area on the image based on an average RGB value.

17. The system of claim 2, wherein detected hairs are removed from the image.

18. The system of claim 2, wherein detected hairs are analyzed for hair length, color, and density.

19. The system of claim 15, wherein the color detection model is configured for converting the automatically marked image into a binary mask for separation of the white area via multiplication with the image.

20. The system of claim 1, wherein the color detection model is configured for automatically marking one or more pixels as white when a pixel has one or more color components exceeding one or more threshold values corresponding to one or more color planes, the one or more color planes including at least a red plane, a green plane, or a blue plane.

21. The system of claim 1, wherein the atypical pigment network detection model is configured for automatically segmenting atypical pigment network based on a variance in a red plane in a lesion area of the image.

22. The system of claim 1, wherein the atypical pigment network detection model is configured for extracting at least one morphological feature selected from the group consisting of lesion area, APN area, ratio of APN area to lesion area, ratio of number of APN blocks to lesion area, ratio of number of APN blocks to number of APN blobs, centroid distance between APN mask centroid and lesion border mask centroid, lesion normalized centroid distance, total number of the outermost pixels of the lesion, ratio of lesion area to image area, APN normalized centroid distance, ratio of lesion perimeter to square root of lesion area, and ratio of lesion perimeter to square root of APN area.

23. The system of claim 1, wherein the atypical pigment network detection model is configured for extracting at least one textural feature selected from the group consisting of average brightness, average contrast, relative smoothness, skewness, uniformity, and entropy.

24. The system of claim 1, wherein the atypical pigment network detection model is configured for extracting at least one color feature selected from the group consisting of average intensity of red color in APN region, average intensity of green color in APN region, average intensity of blue color in APN region, standard deviation of intensity of red color in APN region, standard deviation of intensity of green color in APN region, and/or standard deviation of intensity of blue color in APN region.

25. The system of claim 1, wherein the salient point detection model is configured for extracting candidate line points from the image and linking a plurality of salient points from the candidate line points.

26. The system of claim 1, further comprising a granularity analyzer configured to analyze removed atypical network blocks and determine features of granular areas.

27. A method for diagnosing melanoma and other skin cancers from a dermoscopy image using a diagnostic system including a handcrafted classifier and a deep learning classifier, the method comprising:

performing median color split to the image to separate the image into a plurality of color regions;

performing vessel detection to analyze one or more vessel features;

performing atypical network detection to identify a pigment network whose structure varies in size and shape;

performing salient point detection to detect salient points based on an intensity plane of the image;

performing color detection to detect at least one of a white area, pink shade, a pink blush, and a semi-translucency;

performing hair detection to detect hair and ruler marks on the image;

performing the preceding six steps on the area external to the segmented area of the image;

providing a first analysis result using the manual classifier;

performing deep learning feature detection to automatically detect melanoma and other skin cancer features;

providing a second analysis result using the deep learning classifier based on the automatically detected melanoma and other skin cancer features; and providing an overall analysis result based on the first analysis result and the second analysis result.

28. The method of claim 27, further includes pre-processing the image to identify and remove hair noise from the image.

29. The method of claim 27, wherein performing vessel detection includes detecting vessels that are narrow and red.

30. The method of claim 27, wherein performing vessel detection includes filtering bubbles on the image.

31. The method of claim 27, wherein performing atypical network detection includes determining asymmetry based on eccentricity of detected blocks.

32. The method of claim 27, wherein performing atypical network detection includes applying a green-to-blue ratio threshold to remove false positive granular structures detected as atypical pigment network.

33. The method of claim 27, wherein performing salient point detection includes detecting salient points based on an intensity plane of the image.

34. The method of claim 27, wherein performing deep learning feature detection to automatically detect melanoma and other skin cancer features includes repurposing a pre-trained ResNet model via transfer learning.

35. The method of claim 27, wherein removed atypical network blocks are analyzed and features of granular areas are determined.

36. The method of claim 32, wherein atypical network blocks removed by the green-to-blue ratio threshold are analyzed and features of granular areas are determined.

* * * * *